United States Patent
Kondo et al.

(10) Patent No.: US 8,169,863 B2
(45) Date of Patent: May 1, 2012

(54) TRACKING CONTROL DEVICE, TRACKING CONTROL METHOD, AND OPTICAL DISC DEVICE

(75) Inventors: Kenji Kondo, Osaka (JP); Takeharu Yamamoto, Osaka (JP); Takashi Kishimoto, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/765,216

(22) Filed: Apr. 22, 2010

(65) Prior Publication Data

US 2010/0271911 A1   Oct. 28, 2010

(30) Foreign Application Priority Data

Apr. 23, 2009   (JP) .................................. 2009-104988

(51) Int. Cl.
*G09B 7/00* (2006.01)
(52) U.S. Cl. .................................................. 369/44.11
(58) Field of Classification Search ................. 369/44.11
See application file for complete search history.

(56) References Cited

U.S. PATENT DOCUMENTS

| 4,775,968 | A | 10/1988 | Ohsato |
| 7,327,661 | B2 * | 2/2008 | Ohnishi et al. ........... 369/112.03 |
| 2005/0286360 | A1 | 12/2005 | Nakao |

FOREIGN PATENT DOCUMENTS

| JP | 61-94246 | 5/1986 |
| JP | 2005-346882 | 12/2005 |

* cited by examiner

*Primary Examiner* — Aristotelis Psitos
(74) *Attorney, Agent, or Firm* — Wenderoth, Lind & Ponack, L.L.P.

(57) ABSTRACT

An object of this invention is to improve stability of tracking control and improve recording and reproduction performance. The tracking control device comprises a main push-pull signal generation section, which generates a main push-pull signal based on a signal obtained by photoelectric conversion of return light of the main beam; a microcomputer, which detects an other-layer stray light signal component included in a signal obtained by photoelectric conversion of return light of the sub-beam; a signal correction section, which corrects the signal obtained by photoelectric conversion of the return light of the sub-beam, based on the other-layer stray light signal component; and a sub-push-pull signal generation section, which generates a sub-push-pull signal based on the corrected signal obtained by photoelectric conversion of the return light of the sub-beam.

12 Claims, 7 Drawing Sheets

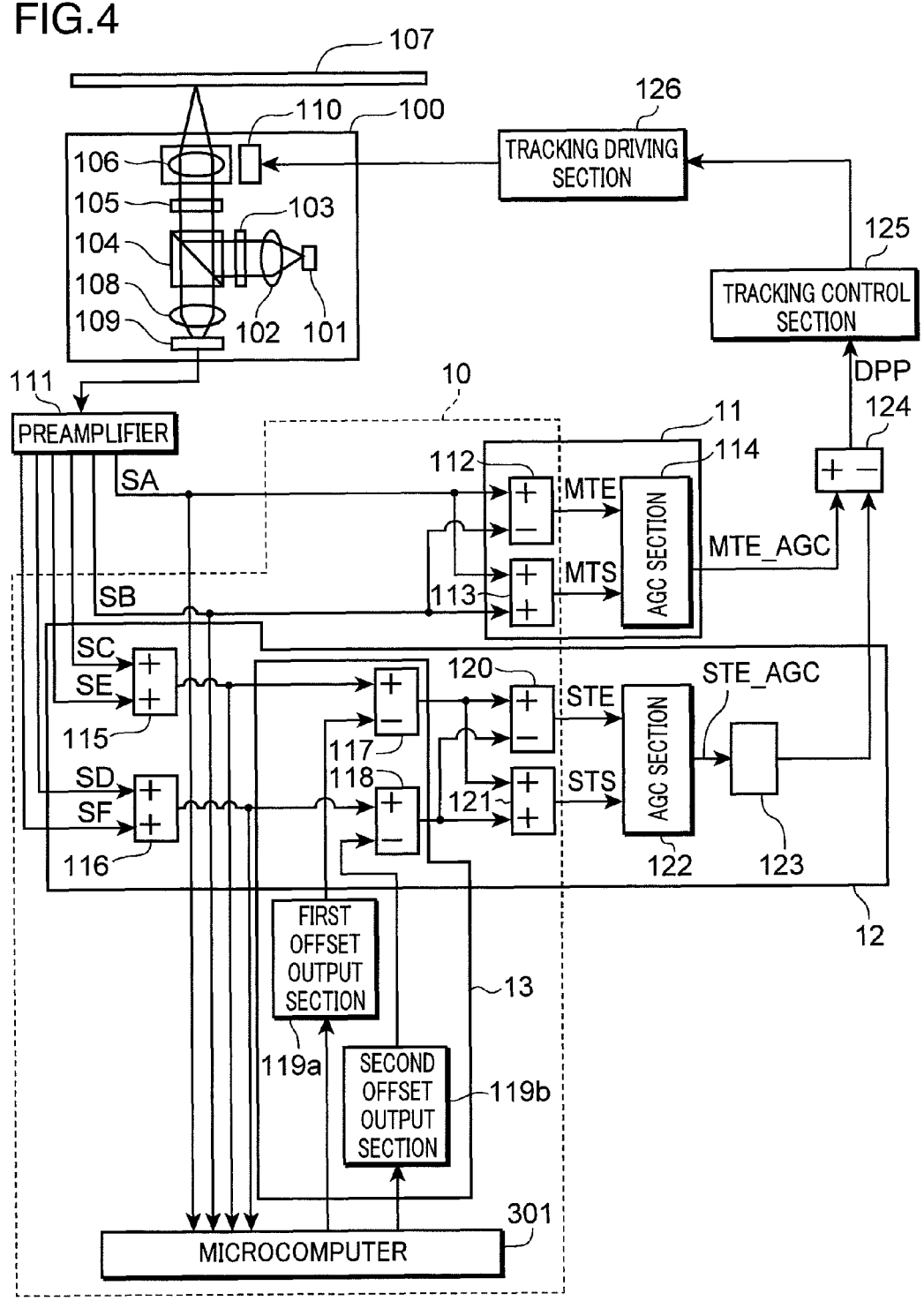

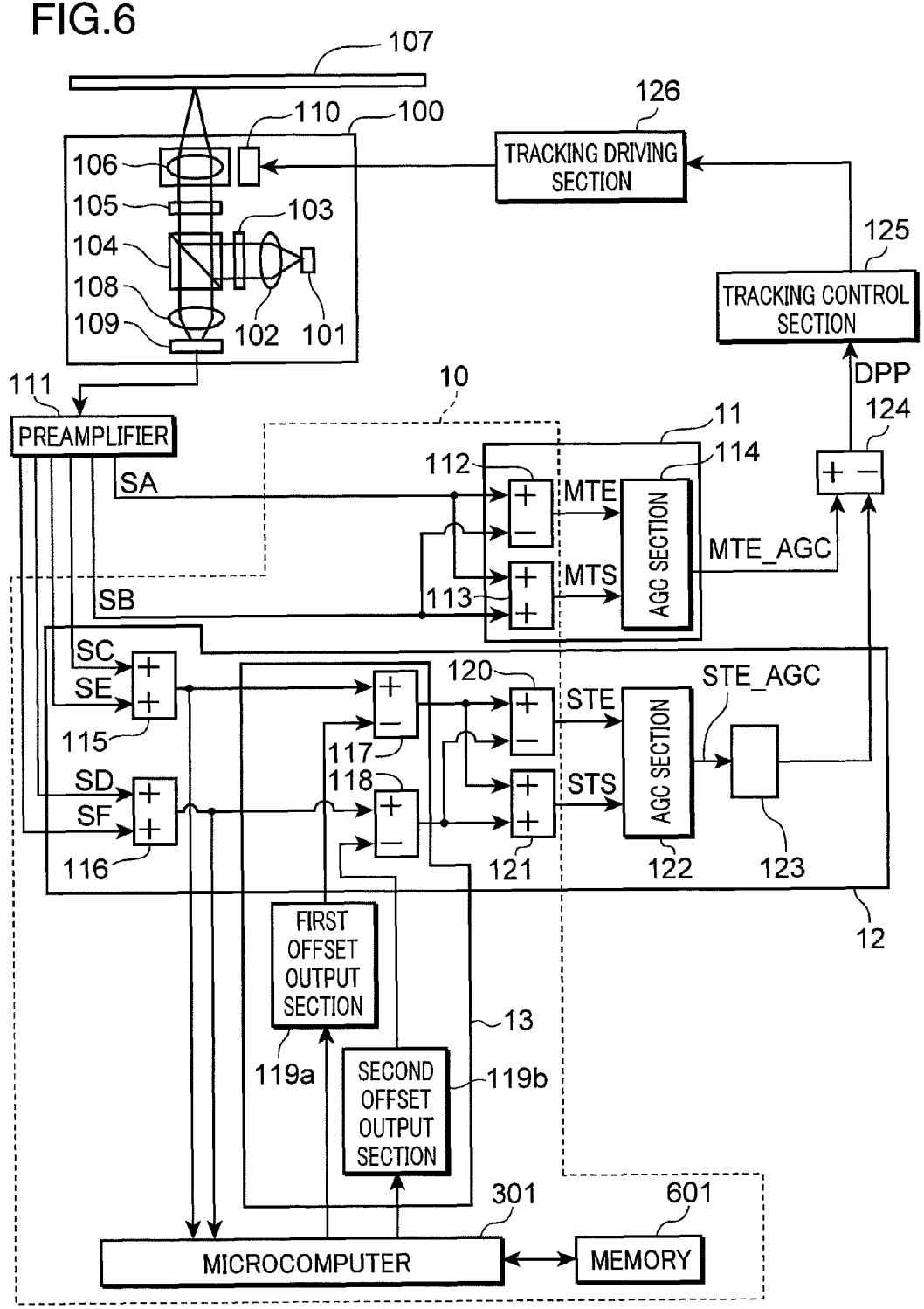

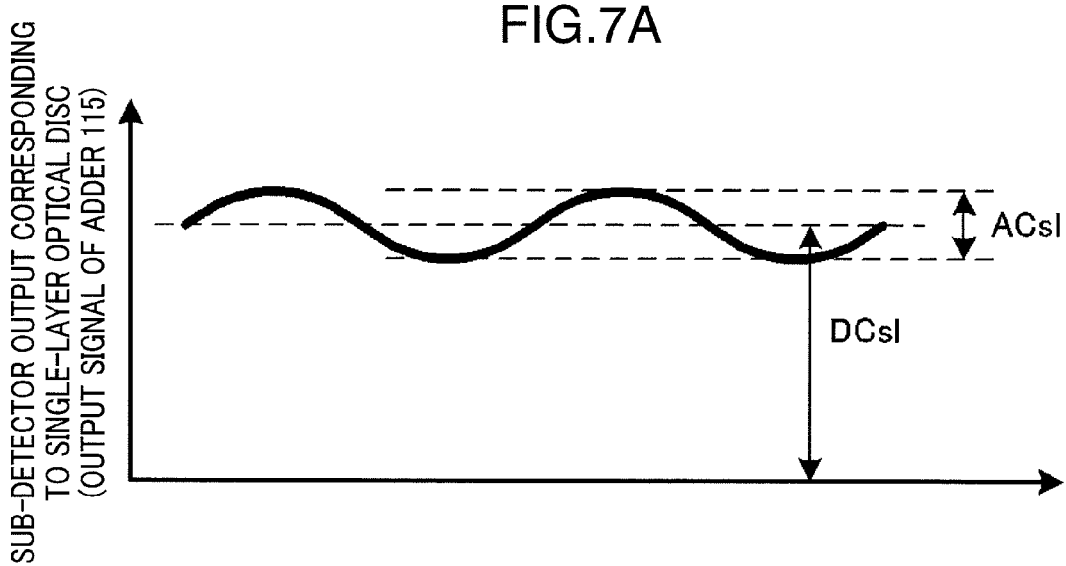
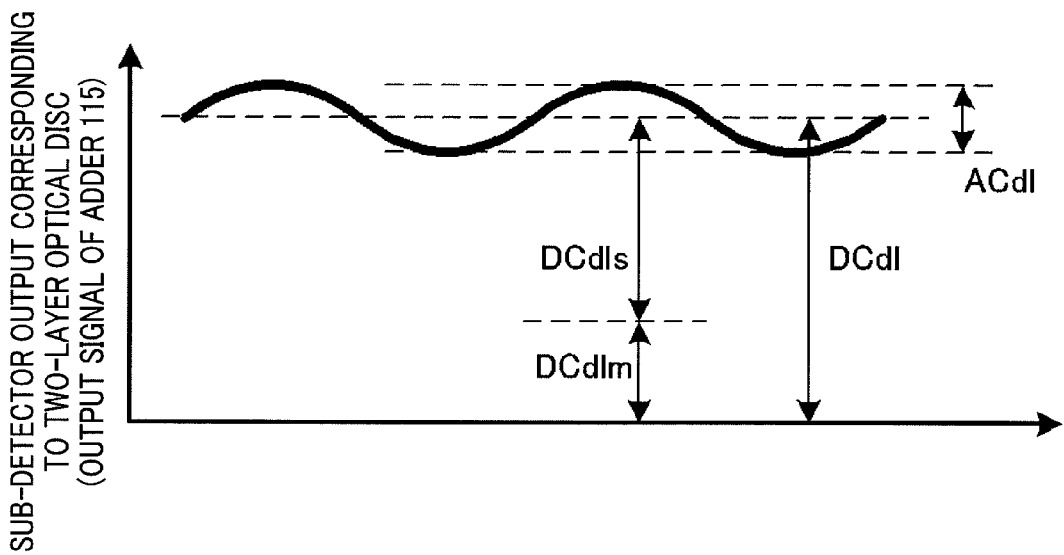

TRACKING CONTROL DEVICE, TRACKING CONTROL METHOD, AND OPTICAL DISC DEVICE

BACKGROUND OF THE INVENTION

1. Field of the Invention

This invention relates to a tracking control device and tracking control method, which cause a main beam and a sub-beam to converge on an information recording medium having a plurality of information layers, and perform control so as to cause the convergence point of the main beam to scan a track of an information layer, as well as an optical disc device which records or reproduces information in an information recording medium having a plurality of information layers.

2. Description of the Background Art

In recent years, optical disc devices have been widely used for the recording and reproduction of image signals and audio signals.

In an optical disc device, processing to read information written to an information layer of an optical disc is performed by using an optical pickup to scan a fine track with a minute light beam spot converging on the optical information layer. In this case, in order to accurately and continuously read information written to the optical disc, servo technology to cause the light beam spot to follow the track is indispensable.

Hence in optical disc devices, generally tracking control is performed which causes the light beam spot to follow a track based on a tracking error signal (hereafter called a "TE signal") which detects shifts in the position of the light beam spot from the track center.

Further, in optical disc devices, generally a so-called push-pull method is used as a detection method for detection of the TE signal.

However, in the case of a TE signal detected by the push-pull method, lens shift in which for example an objective lens is shifted in a direction perpendicular to the optical axis of the light beam may occur, or, when there is inclination of an information layer, return light from the light beam reflected from the information layer may be received at a position shifted from the center of the light-receiving face of a detector which is a photoreceiving element. As a result, the TE signal may not be 0 even in a state in which the light beam spot is positioned in the center of the track, so that an offset occurs.

Hence if such a TE signal is used to perform tracking control, the light beam spot does not correctly scan the track center, and a decline in the recording and reproduction performance of the optical disc device may result.

The differential push-pull method is a detection method to prevent offset occurring due to such TE signals. In the differential push-pull method, the light beam irradiating the optical disc is divided into three beams, which are one main beam and two sub-beams. In the differential push-pull method, a main push-pull tracking error signal (hereafter called the "MTE signal") detected by the main beam, and a sub-push-pull tracking error signal (hereafter called the "STE signal") detected by the two sub-beams, are generated; by calculating the difference between the MTE signal and a signal obtained by multiplying the STE signal by a coefficient, a differential push-pull tracking error signal (hereafter called the "DPP signal") is detected.

In the differential push-pull method, offsets occur in both the MTE signal and the STE signal due to lens shifts and information layer inclination. Hence by appropriately setting the coefficient to be multiplied with the STE signal, the offset included in the DPP signal which is a differential signal can be cancelled (see for example Japanese Patent Application Laid-open No. 61-94246).

Further, even when the optical disc reflectivity varies or the light beam irradiation power during recording or reproduction varies, the detection gain for the above-described MIE signal and STE signal is generally held constant by an AGC (Automatic Gain Control) circuit, which normalizes the MTE signal and STE signal by the light quantity of the return light. As a result, stabilized tracking control can be realized.

In an optical disc device in which a main beam and a sub-beam are used to perform tracking control, in general, the intensity ratio of the main beam to the sub-beam is often set to approximately 10:1. In an optical disc device with such a setting, when information is recorded onto or reproduced from a two-layer optical disc or another optical disc having a plurality of information layers, the following problem occurs.

For example, in a two-layer optical disc, when one information layer which is the layer to be accessed is irradiated with a light beam in order to reproduce a signal, light reflected from the one information layer contains light reflected from the other information layer which is not to be accessed (other-layer stray light). It is difficult to separate reflected light from the one information layer and reflected light from the other information layer. For this reason, the other-layer stray light signal component is also detected by a detector. In this case, the other-layer stray light of the main beam is detected by a sub-detector which receives the sub-beam, and the return light quantity of the sub-beam cannot be correctly detected. As a result, an AGC circuit cannot correctly normalize a signal to correct changes in the optical disc reflectivity or changes in the light beam irradiation power during recording and reproduction, and a DPP signal having an appropriate detection gain cannot be obtained. Hence instability in tracking control results, and the recording and reproduction performance of the optical disc device tend to decline.

In order to resolve such problems, an optical pickup has been proposed in which a detector is provided to detect other-layer stray light of the main beam, and by using the result of subtraction of the detected light quantity of other-layer stray light from the sub-beam detected light quantity in the AGC circuit, a DPP signal is generated such that correction of the light quantity of sub-beam return light is performed, and the effect of other-layer stray light is reduced (see for example Japanese Patent Application Laid-open No. 2005-346882).

However, in an optical pickup of the prior art, correction of an other-layer stray light signal component requires a dedicated detector to detect other-layer stray light. Hence the addition of optical components, peripheral circuitry for optical components, and adjustment processes is entailed, and as a result, the problem of increased cost of the optical disc device occurs.

SUMMARY OF THE INVENTION

This invention was devised in order to resolve the above problems, and has as an object the provision of an optical disc device which can perform stable tracking control, and in which moreover the number of components can be reduced.

The tracking control device according to one aspect of the invention is a tracking control device which performs control so as to cause a convergence point of a main beam to scan a track on a prescribed information layer, based on a differential push-pull signal obtained by subtracting a sub-push-pull signal generated from return light of a sub-beam reflected from the prescribed information layer of an information recording medium having a plurality of information layers, from a main push-pull signal generated from return light of the main beam reflected from the prescribed information layer, and the tracking control device comprises: a main push-pull signal generation section, which generates a main push-pull signal based on a signal obtained by photoelectric conversion of the return light of the main beam; an other-layer stray light detection section, which detects an other-layer stray light signal component that is included in a signal obtained by photoelectric conversion of the return light of the sub-beam, and that is equivalent to other-layer stray light reflected from an information layer different from the information layer on which the main beam is converged; a signal correction section, which corrects the signal obtained by photoelectric conversion of the return light of the sub-beam, based on the other-layer stray light signal component detected by the other-layer stray light detection section; and a sub-push-pull signal generation section, which generates the sub-push-pull signal based on the signal obtained by photoelectric conversion of the return light of the sub-beam, corrected by the signal correction section.

By means of this configuration, an other-layer stray light signal component that is included in a signal obtained by photoelectric conversion of the return light of a sub-beam and that is equivalent to other-layer stray light reflected from an information layer different from the information layer on which the main beam is converged, is detected. And, based on the detected other-layer stray light signal component, the signal obtained by photoelectric conversion of the return light of the sub-beam is corrected. Based on a signal obtained by photoelectric conversion of the corrected sub-beam return light, a sub-push-pull signal is generated.

By means of this invention, tracking control can be performed based on a differential push-pull signal corrected for an other-layer stray light signal component equivalent to other-layer stray light reflected from an information layer different from the information layer on which a main beam is converged. Hence the stability of tracking control can be improved, and recording and reproduction performance can be improved as well. Further, a dedicated detector to detect other-layer stray light of the main beam is unnecessary, so that the number of components can be reduced, and manufacturing costs can be lowered.

BRIEF DESCRIPTION OF THE DRAWINGS

FIG. 4 is a block diagram showing the configuration of the optical disc device of Embodiment 3 of the invention;

FIG. 6 is a block diagram showing the configuration of the optical disc device of Embodiment 4 of the invention; and FIG. 7A and FIG. 7B are waveform diagrams showing a sub-detector output signal corresponding to a single-layer optical disc and a sub-detector output signal corresponding to a two-layer optical disc, in Embodiment 4 of the invention.

DETAILED DESCRIPTION OF THE PREFERRED EMBODIMENTS OF THE INVENTION

Figure 1:
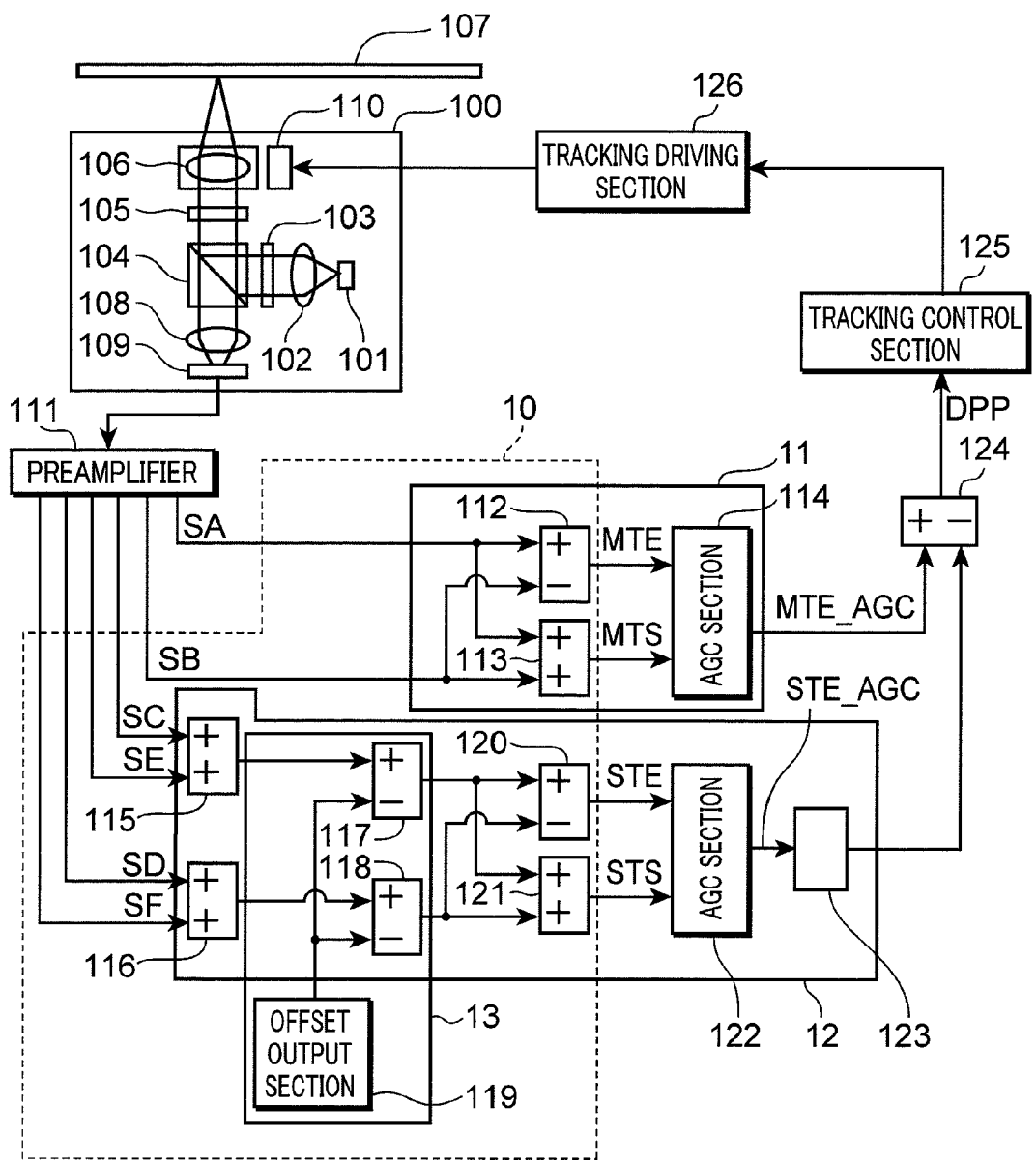
FIG. 1 is a block diagram showing the configuration of the optical disc device of Embodiment 1 of the invention.

Below, embodiments of the invention are explained, referring to the drawings. The following embodiments are merely specific examples of the invention, and are not intended to limit the technical scope of the invention.

(Embodiment 1)

FIG. 1 is a block diagram showing the configuration of the optical disc device of Embodiment 1 of the invention. In FIG. 1, the optical disc device comprises an optical pickup 100, preamplifier 111, subtractor 112, adder 113, AGC section 114, adder 115, adder 116, subtractor 117, subtractor 118, offset output section 119, subtractor 120, adder 121, AGC section 122, amplifier 123, subtractor 124, tracking control section 125, and tracking driving section 126.

The optical pickup 100 comprises a light source 101, collimator lens 102, diffraction grating 103, polarizing beam splitter 104, quarter-wave plate 105, objective lens 106, condenser lens 108, detector 109, and tracking actuator 110.

The light source 101 is formed using a semiconductor laser element, and outputs a light beam to an information layer of the optical disc 107. The collimator lens 102 converts divergent light emitted from the light source 101 into parallel light. The diffraction grating 103 divides the light beam emitted from the light source 101 into a main beam, which is 0th-order diffracted light, and sub-beams, which are ±1st-order diffracted light.

The polarizing beam splitter 104 performs total reflection of a linearly polarized component of the light beam emitted from the light source 101, and performs total transmission of the light component which is linearly polarized perpendicularly to the linearly polarized component of the light beam emitted from the light source 101. The quarter-wave plate 105 converts the transmitted light beam from circularly-polarized light into linearly-polarized light, and from linearly-polarized light into circularly-polarized light.

The objective lens 106 condenses the light beam on an information layer of the optical disc 107. Further, the objective lens 106 converges the main beam and sub-beams on a prescribed information layer of the optical disc 107 having a plurality of information layers. The optical disc 107 has a first information layer and a second information layer. The condenser lens 108 condenses the light beam which has passed through the polarizing beam splitter 104 on the detector 109. The detector 109 converts the received light beam into an electrical signal. The detector 109 comprises a plurality of two-segment light-receiving elements.

Figure 2:
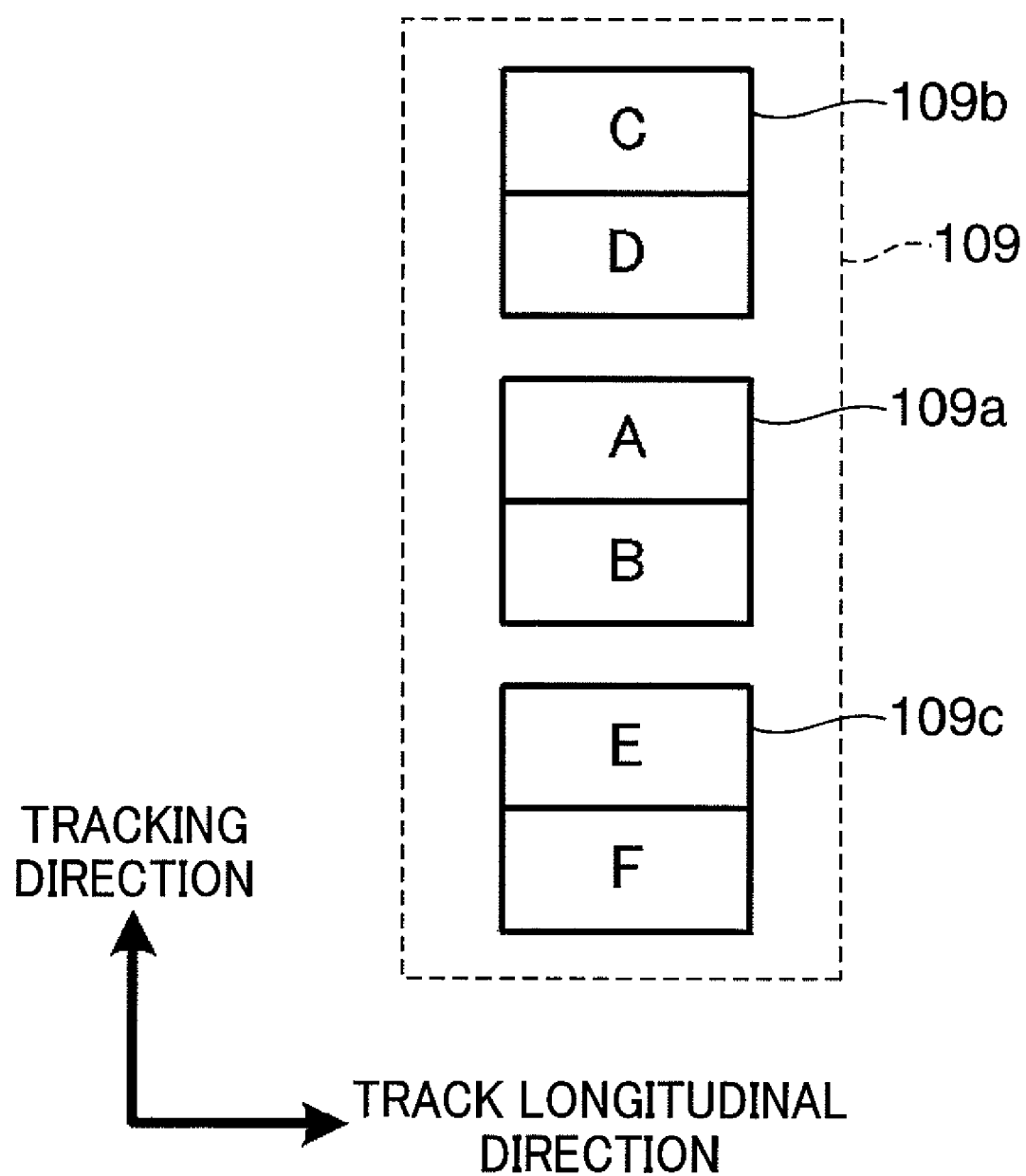
FIG. 2 is a plane view showing the configuration of the detector in Embodiment 1 of the invention.

Here, the configuration of the detector 109 is explained. FIG. 2 is a plane view showing the configuration of the detector 109 in Embodiment 1 of the invention. In FIG. 2, the vertical direction in the plane of the paper represents the radial direction of the optical disc 107 (hereafter called the "tracking direction"), and the horizontal direction in the plane of the paper represents the track longitudinal direction.

As shown in FIG. 2, the detector 109 comprises a main detector 109a, a first sub-detector 109b, and a second sub-detector 109c. The main detector 109a includes detection regions A and B divided in two in the tracking direction, the first sub-detector 109b includes detection regions C and D divided in two in the tracking direction, and the second sub-detector 109c includes detection regions E and F divided in two in the tracking direction.

The main detector 109a receives return light of the main beam reflected by the prescribed information layer. The first sub-detector 109b and second sub-detector 109c each receive return light of sub-beams reflected by the prescribed information layer.

Further, a main push-pull signal generation section 11 comprises the subtractor 112, adder 113, and AGC section 114. A sub-push-pull signal generation section 12 comprises the adder 115, adder 116, subtractor 117, subtractor 118, subtractor 120, adder 121, AGC section 122, and amplifier 123. A signal correction section 13 comprises the subtractor 117, subtractor 118, and offset output section 119.

Further, a tracking control device 10 includes at least the subtractor 112, adder 113, adder 115, adder 116, subtractor 117, subtractor 118, offset output section 119, subtractor 120, and adder 121. The tracking control device 10 is formed using a single-chip integrated circuit.

The tracking control device 10 executes control to cause a main beam convergence point to scan a track on a prescribed information layer, based on a differential push-pull signal obtained by subtracting a sub-push-pull signal generated from return light of a sub-beam reflected by the prescribed information layer of the optical disc having a plurality of information layers, from a main push-pull signal generated from return light of the main beam reflected by the prescribed information layer.

The main push-pull signal generation section 11 generates the main push-pull signal based on a signal obtained by photoelectric conversion of the return light of the main beam. The sub-push-pull signal generation section 12 generates the sub-push-pull signal based on a signal obtained by photoelectric conversion of the return light of the sub-beam. The signal correction section 13 corrects the signal obtained by photoelectric conversion of the return light of the sub-beam.

The preamplifier 111 converts output currents from each of the detection regions A, B, C, D, E and F of the detector 109 into voltages, and outputs the converted voltages as output signals SA, SB, SC, SD, SE and SF. The output signal SB converted by the preamplifier 111 is subtracted from the output signal SA converted by the preamplifier 111, and the subtracted value is output as an MTE signal. The adder 113 adds the output signal SA and the output signal SB, and the added value is output as a main tracking addition signal (hereafter called an "MTS signal"). The AGC section 114 uses the MTS signal to normalize the MTE signal, and outputs the normalized signal as an MTE_AGC signal.

The adder 115 adds the output signal SC converted by the preamplifier 111 and the output signal SE converted by the preamplifier 111, and outputs the result. The adder 116 adds the output signal SD converted by the preamplifier 111 and the output signal SF converted by the preamplifier 111, and outputs the result.

The offset output section 119 outputs a prescribed offset value equivalent to the other-layer stray light signal component. The subtractor 117 subtracts the offset value output by the offset output section 119 from the signal output by the adder 115, and outputs the result. The subtractor 118 subtracts the offset value output by the offset output section 119 from the signal output by the adder 116, and outputs the result.

The subtractor 120 subtracts the signal output by the subtractor 118 from the signal output by the subtractor 117, and outputs the subtracted value as an STE signal. The adder 121 adds the signal output by the subtractor 117 and the signal output by the subtractor 118, and outputs the added value as a sub-tracking addition signal (hereafter called the "STS signal"). The AGC section 122 uses the STS signal to normalize the STE signal, and outputs the normalized signal as an STE_AGC signal. The amplifier 123 amplifies the STE_AGC signal from the AGC section 122.

The subtractor 124 subtracts the STE_AGC signal of the amplifier 123 from the MTE_AGC signal of the AGC section 114, and outputs the subtracted value as a DPP signal. That is, the subtractor 124 generates a differential push-pull signal obtained by subtracting the sub-push-pull signal from the main push-pull signal.

The tracking control section 125 outputs a tracking control signal based on the DPP signal output by the subtractor 124. The tracking control section 125 drives the tracking actuator 110 based on the differential push-pull signal (DPP signal) generated by the subtractor 124, and performs control such that the main beam convergence point scans a track on the information layer.

The tracking driving section 126 outputs a tracking actuator driving signal based on the tracking control signal output by the tracking control section 125. The tracking actuator 110 moves the objective lens 106 in the tracking direction (the direction perpendicular to the track on the information layer) based on the tracking actuator driving signal output by the tracking driving section 126.

In Embodiment 1, the objective lens 106 is equivalent to one example of a convergence section, the main detector 109a is equivalent to one example of a main beam light-receiving section, the first sub-detector 109b and second sub-detector 109c are equivalent to examples of a sub-beam light-receiving section, the tracking actuator 110 is equivalent to one example of a track-direction movement section, the main push-pull signal generation section 11 is equivalent to one example of a main push-pull signal generation section, the sub-push-pull signal generation section 12 is equivalent to one example of a sub-push-pull signal generation section, the subtractor 124 is equivalent to one example of a differential push-pull signal generation section, the tracking control section 125 is equivalent to one example of a tracking control section, and the signal correction section 13 is equivalent to one example of a signal correction section.

Next, operation of the optical disc device configured as described above is explained.

A linearly polarized light beam emitted from the light source 101 is incident on the collimator lens 102, and is converted into parallel light by the collimator lens 102. The light beam converted into parallel light by the collimator lens 102 is incident on the diffraction grating 103, and is divided into a main beam, which is 0th-order diffracted light, and sub-beams, which are ±1st-order diffracted light. The main beam and sub-beam divided by the diffraction grating 103 are incident on the polarizing beam splitter 104. The main beam and sub-beams reflected by the polarizing beam splitter 104 are converted into circularly-polarized light by the quarter-wave plate 105. The main beam and sub-beams which have been converted into circularly-polarized light by the quarter-wave plate 105 are incident on the objective lens 106, and converge on and irradiate a prescribed information layer of the optical disc 107.

The main beam and sub-beams reflected from the prescribed information layer of the optical disc 107 pass through the objective lens 106 and polarizing beam splitter 104, and are incident on the condenser lens 108. The main beam and sub-beams incident on the condenser lens 108 are condensed on the detector 109. The main beam condensed on the detector 109 is converted into electrical signals in the detection regions A and B of the main detector 109a. The sub-beams condensed on the detector 109 are converted into electrical signals in the detection regions C and D of the first sub-detector 109b and in the detection regions E and F of the second sub-detector 109c.

The electrical signals converted in each of the detection regions A through F of the detector 109 are converted into signals SA through SF, which are voltage values, by the preamplifier 111. The signals SA and SB are output to the subtractor 112 and adder 113 respectively, the signals SC and SE are output to the adder 115, and the signals SD and SF are output to the adder 116.

The subtractor 112 subtracts the output signal SB of the preamplifier 111 from the output signal SA of the preamplifier 111. The subtraction result is output as an MTE signal, indicating the positional relation between the main beam spot and the track on the information layer of the optical disc 107. Further, the adder 113 adds the output signal SA of the preamplifier 111 and the output signal SB of the preamplifier 111. The addition result is output as an MTS signal indicating the return light quantity of the main beam from the information layer of the optical disc 107. The MTE signal and MTS signal are input to the AGC section 114. The AGC section 114 outputs the MTE signal, normalized according to the main beam return light quantity, to the subtractor 124 as an MTE_AGC signal.

The adder 115 adds the output signal SC of the preamplifier 111 and the output signal SE of the preamplifier 111. The subtractor 117 subtracts a prescribed offset value, equivalent to the other-layer stray light included in the sub-beam, from the output signal of the adder 115. By this means, the other-layer stray light signal component included in the output signal of the adder 115 is corrected.

The adder 116 adds the output signal SD of the preamplifier 111 and the output signal SF of the preamplifier 111. The subtractor 118 subtracts a prescribed offset value, equivalent to the other-layer stray light included in the sub-beam, from the output signal of the adder 116. By this means, the other-layer stray light signal component included in the output signal of the adder 116 is corrected. The offset value output from the offset output section 119 is input to the subtractor 117 and to the subtractor 118.

The subtractor 120 subtracts the output signal of the subtractor 118 from the output signal of the subtractor 117. The subtraction result is output as an STE signal indicating the positional relation between the sub-beam spot and the track on the information layer of the optical disc 107. The adder 121 adds the output signal of the subtractor 117 and the output signal of the subtractor 118. The addition result is output as an STS signal indicating the sub-beam return light quantity on the information layer of the optical disc 107, corrected for other-layer stray light. The STE signal and the STS signal are input to the AGC section 122.

The AGC section 122 outputs the STE signal normalized according to the sub-beam return light quantity to the amplifier 123 as an STE_AGC signal. The STE_AGC signal input to the amplifier 123 is amplified by a prescribed amplification, and is output to the subtractor 124.

The subtractor 124 subtracts the STE_AGC signal amplified by the amplifier 123 from the MTE_AGC signal output by the AGC section 122. The subtracted value is output as a DPP signal to the tracking control section 125. The DPP signal is input to the tracking control section 125, passes through a phase compensation circuit and low-frequency compensation circuit formed for example by a digital filter employing a digital signal processor (hereafter called a "DSP"), and is converted into a tracking control signal. The tracking control signal is input to the tracking driving section 126. The tracking driving section 126 amplifies the tracking control signal, and outputs a tracking actuator driving signal to the tracking actuator 110.

By means of the above operation, by using a DPP signal generated using an STE_AGC signal corrected for the other-layer stray light signal component, tracking control is realized to perform control such that the track on which data is being recorded in an information layer of the optical disc 107 is scanned correctly.

Here, correction for the other-layer stray light signal component in Embodiment 1 is explained.

For example, in a two-layer optical disc having two information layers, when the reflectivities of the layers are equal, the light quantity ratio detected by the detector of the return light quantity from the information layer which is being accessed by the light beam and the light quantity of other-layer stray light, is approximately as expressed by equation (1) below.

$$\text{light quantity ratio} = S/M^2/\{\pi(2d \times NA/n)\}^2 \qquad (1)$$

In equation (1) above, S represents the light-receiving area of the detector, M represents the magnification of the detection optical system, d represents the interlayer interval between adjacent information layers, NA represents the numerical aperture of the objective lens 106, and n represents the refractive index of the cover layer of the optical disc 107.

Here, when in the optical pickup 100 the numerical aperture of the objective lens 106 is 0.6, the size of the detector is 150 μm on a side, and the detection optical magnification is 10×, and when in the optical disc 107, the interlayer interval is 55 μm and the cover layer refractive index is 1.6, from equation (1) above the light quantity ratio is 4.2%. Further, if the light quantity ratio of the main beam to the sub-beam divided by the diffraction grating 103 is 10:1, then the light quantity ratio detected by the sub-detector of the sub-beam to the other-layer stray light due to the main beam is 42%.

On the other hand, the level of the sub-beam detected by the sub-detector can be calculated as a setting value based on the reflectivities of each of the layers of the optical disc 107 used, the light beam irradiation power during recording and reproduction operation, and the detection sensitivity of the sub-detector. Hence the other-layer stray light signal component due to the main beam, contained in the output from the sub-detector, can be calculated. That is, in the above example the light quantity ratio of the sub-beam to the other-layer stray light is 42%, and so the other-layer stray light signal component is 42% of the design value of the sub-beam output level calculated in advance.

In this embodiment, the sub-detector detection output is corrected using a prescribed level, calculated as described above, for the other-layer stray light signal component.

That is, the offset output section 119 outputs as an offset value an other-layer stray light signal component with a prescribed level, calculated in advance. The subtractors 117 and 118 subtract the offset value from the signals SC through SF corresponding to the outputs from the first and second sub-detectors 109b and 109c. By this means, other-layer stray light signal components included in the outputs from the first and second sub-detectors 109b and 109c can be removed.

Hence tracking control can be performed using a DPP signal generated from an STE_AGC signal from which other-layer stray signal components included in outputs from the first and second sub-detectors 109b and 109c have been removed. Consequently, even when the information layer reflectivities change, or the light beam irradiation power changes during recording and reproduction, the detection gain is held constant, and stable tracking control is possible. As a result, the recording and reproduction performance of the optical disc device can be improved.

In Embodiment 1, the main detector 109a, first sub-detector 109b, and second sub-detector 109c have detection regions divided in two in the tracking direction; but this invention is not limited to such a structure.

In Embodiment 1, the light quantity ratio of the sub-beam detected by a sub-detector to the other-layer stray light of the main beam is 42%, but this invention is not limited to such a light quantity ratio. The offset output section 119 may detect different parameters according to the optical disc used, such as for example the reflectivity of each layer and the interlayer intervals, calculate the light quantity ratio using the detected parameters, and calculate the other-layer stray light signal component (offset value) based on the calculated light quantity ratio.

Further, in for example a three-layer optical disc having three information layers L0 through L2, when the reflectivities of all of the layers are equal, the light quantity ratio detected by a detector of the return light quantity from the information layer L0 which is being accessed to the light quantities of other-layer stray light from the other information layers L1, L2 not being accessed is approximately as expressed by equation (2) below.

$$\text{light quantity ratio} = R01 + R02 \quad (2)$$

In the above equation (2), R01 represents the light quantity ratio calculated with d in equation (1) above as the interlayer interval between information layer L0 and information layer L1, and R02 represents the light quantity ratio calculated with d in equation (1) above as the interlayer interval between information layer L0 and information layer L2.

In this way, for an optical disc with three or more layers, the light quantity ratios are calculated using equation (1) above for return light from an information layer being accessed and the light quantities of other-layer stray light from the other information layers not being accessed, and by taking the sum of the calculated light quantity ratios, the light quantity ratio of the return light from the information layer being accessed to the light quantity of other-layer stray light from the other information layers not being accessed can be calculated.

(Embodiment 2)

Figure 3:
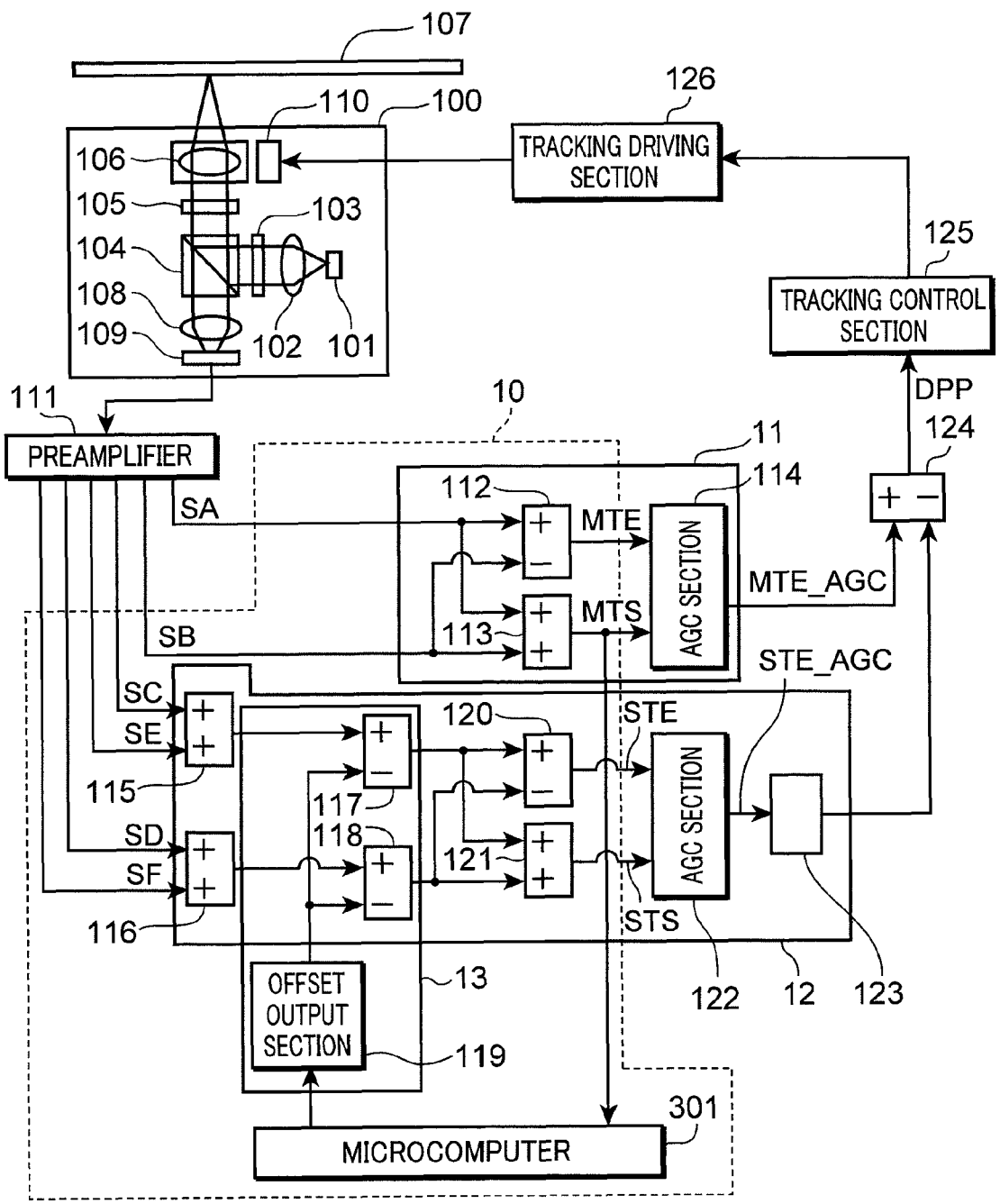
FIG. 3 is a block diagram showing the configuration of the optical disc device of Embodiment 2 of the invention.

FIG. 3 is a block diagram showing the configuration of the optical disc device of Embodiment 2 of the invention. The same symbols are assigned to components similar to those in Embodiment 1, and explanations are omitted.

In FIG. 3, the optical disc device comprises an optical pickup 100, preamplifier 111, subtractor 112, adder 113, AGC section 114, adder 115, adder 116, subtractor 117, subtractor 118, offset output section 119, subtractor 120, adder 121, AGC section 122, amplifier 123, subtractor 124, tracking control section 125, tracking driving section 126, and microcomputer 301.

An MTS signal output from the adder 113 is input to the AGC section 114, and is also input to the microcomputer 301. The offset output section 119 outputs an offset value, the level of which changes according to a setting signal from the microcomputer 301.

Further, a main push-pull signal generation section 11 comprises the subtractor 112, adder 113, and AGC section 114. A sub-push-pull signal generation section 12 comprises the adder 115, adder 116, subtractor 117, subtractor 118, subtractor 120, adder 121, AGC section 122, and amplifier 123. A signal correction section 13 comprises the subtractor 117, subtractor 118, and offset output section 119.

Further, a tracking control device 10 includes at least the subtractor 112, adder 113, adder 115, adder 116, subtractor 117, subtractor 118, offset output section 119, subtractor 120, adder 121, and microcomputer 301. The tracking control device 10 is formed using a single-chip integrated circuit.

The microcomputer 301 detects an other-layer stray light signal component that is included in a signal obtained by photoelectric conversion of the return light of the sub-beam, and that is equivalent to other-layer stray light reflected from information layers different from the information layer on which the main beam is converged. The signal correction section 13 corrects the signal obtained by photoelectric conversion of the sub-beam return light, based on the other-layer stray light signal component detected by the microcomputer 301. The sub-push-pull signal generation section 12 generates a sub-push-pull signal based on a signal obtained by photoelectric conversion of sub-beam return light, corrected by the signal correction section 13.

The microcomputer 301 calculates, as the other-layer stray light signal component, a prescribed fraction of the signal level of the signal obtained by photoelectric conversion of the main beam return light. Further, the microcomputer 301 calculates the light quantity ratio of the main beam return light quantity to the other-layer stray light quantity, and by multiplying the calculated light quantity ratio by the signal obtained by photoelectric conversion of the main beam return light, calculates the other-layer stray light signal component.

More specifically, the microcomputer 301 calculates the light quantity ratio of the light quantity of main beam return light to the light quantity of other-layer stray light, based on the light quantity ratio of the main beam to the sub-beam, the light-receiving areas of the first sub-detector 109b and second sub-detector 109c which receive the sub-beam, the detection magnifications of the first sub-detector 109b and second sub-detector 109c, the numerical aperture of the convergence section causing convergence of the main beam and sub-beam on the prescribed information layer, the refractive index of the cover layer of the optical disc 107, and the interlayer intervals between the prescribed information layer and other information layers.

In Embodiment 2, the objective lens 106 is equivalent to one example of a convergence section, the main detector 109a is equivalent to one example of a main beam light-receiving section, the first sub-detector 109b and second sub-detector 109c are equivalent to examples of a sub-beam light-receiving section, the tracking actuator 110 is equivalent to one example of a track-direction movement section, the main push-pull signal generation section 11 is equivalent to one example of a main push-pull signal generation section, the sub-push-pull signal generation section 12 is equivalent to one example of a sub-push-pull signal generation section, the subtractor 124 is equivalent to one example of a differential push-pull signal generation section, the tracking control section 125 is equivalent to one example of a tracking control section, the microcomputer 301 is equivalent to one example of an other-layer stray light detection section, and the signal correction section 13 is equivalent to one example of a signal correction section.

Operation of the optical disc device configured as described above is explained. Explanations of operation which is similar to that in Embodiment 1 are omitted.

The MTS signal indicating the main beam return light quantity is input to the microcomputer 301. The microcomputer 301 calculates the other-layer stray light signal component included in the outputs from the first sub-detector 109b and second sub-detector 109c based on the signal level of the input MTS signal, and sets the calculated other-layer stray light signal component in the offset output section 119.

Here, detection and correction for the other-layer stray light signal component in Embodiment 2 are explained.

When the optical parameters of the optical pickup 100 and the parameters of the optical disc 107 in Embodiment 2 are the same as in Embodiment 1, as explained in Embodiment 1, the light quantity ratio of the main beam light quantity to the light quantity of other-layer stray light due to the main beam detected by the detector is 4.2%.

On the other hand, the signal level of the MTS signal input to the microcomputer 301 is a signal level corresponding to the main beam return light quantity. Consequently the microcomputer 301 can use the signal level of the MTS signal to calculate the other-layer stray light signal component due to the main beam detected by the first sub-detector 109b and the second sub-detector 109c.

The microcomputer 301 calculates the other-layer stray light signal component based on the light quantity ratio of the main beam light quantity to the other-layer stray light quantity, and on the signal level corresponding to the main beam return light quantity. That is, the microcomputer 301 calculates the light quantity ratio of the main beam light quantity to the other-layer stray light quantity based on equation (1) above, and by multiplying the calculated light quantity ratio with the signal level of the input MTS signal, calculates the other-layer stray light signal component.

In Embodiment 2, the microcomputer 301 removes the other-layer stray light signal component included in the outputs of the first and second sub-detectors 109b and 109c by setting the calculated other-layer stray light signal component in the offset output section 119.

That is, the microcomputer 301 detects the signal level of the input MTS signal, and calculates 4.2% of the signal level of the detected MTS signal as the other-layer stray light signal component. The microcomputer 301 sets the signal level equivalent to the calculated other-layer stray light signal component as an offset value in the offset output section 119. The offset output section 119 outputs the offset value set by the microcomputer 301. The subtractors 117 and 118 subtract the offset value from the output signals SC through SF of the first and second sub-detectors 109b and 109c. By this means, the other-layer stray light signal components included in the outputs from the first and second sub-detectors 109b and 109c can be removed.

The microcomputer 301 may store in advance the light quantity ratio of the main beam light quantity to the light quantity of other-layer stray light due to the main beam and detected by the detector 109.

Hence in Embodiment 2, tracking control can be performed using a DPP signal generated from an STE_AGC signal from which other-layer stray signal component has been appropriately removed according to the multilayer optical disc with which information is recorded or reproduced. Consequently, even when the information layer reflectivities change, or the light beam irradiation power changes during recording and reproduction, the detection gain is held constant, and stable tracking control is possible. As a result, the recording and reproduction performance of the optical disc device can be improved.

In Embodiment 2, the light quantity ratio of the main beam light quantity to the light quantity of other-layer stray light due to the main beam and detected by the detector 109 is 4.2%, but this invention is not limited to such a light quantity ratio. When the microcomputer 301 calculates the offset value from the MTS signal, different parameters, such as for example the reflectivities of layers and interlayer intervals, may be detected according to the optical disc used, and the detected parameters used to calculate the light quantity ratio, and based on the calculated light quantity ratio the other-layer stray light signal component (offset value) may be calculated.

The cover layer refractive index, interlayer intervals between a prescribed information layer and other information layers, and other parameters of the optical disc 107 may differ according to the type of optical disc 107. Hence the microcomputer 301 may, for each type of optical disc 107, calculate the light quantity ratio of the main beam return light quantity to the other-layer stray light quantity, and multiply the calculated light quantity ratio by the signal obtained by photoelectric conversion of the main beam return light, to calculate the other-layer stray light signal component.

(Embodiment 3)

FIG. 4 is a block diagram showing the configuration of the optical disc device of Embodiment 3 of the invention. The same symbols are assigned to components similar to those in Embodiments 1 and 2, and explanations are omitted.

In FIG. 4, the optical disc device comprises an optical pickup 100, preamplifier 111, subtractor 112, adder 113, AGC section 114, adder 115, adder 116, subtractor 117, subtractor 118, first offset output section 119a, second offset output section 119b, subtractor 120, adder 121, AGC section 122, amplifier 123, subtractor 124, tracking control section 125, tracking driving section 126, and microcomputer 301.

The output signals SA and SB of the preamplifier 111 are input to the subtractor 112 and adder 113, and are also input to the microcomputer 301. The output signal of the adder 115 is input to the subtractor 117, and is also input to the microcomputer 301, and the output signal of the adder 116 is input to the subtractor 118, and is also input to the microcomputer 301.

The first offset output section 119a outputs a first offset value, the level of which changes according to a setting signal from the microcomputer 301. The second offset output section 119b outputs a second offset value, the level of which changes according to a setting signal from the microcomputer 301. The subtractor 117 subtracts the first offset value, output by the first offset output section 119a, from the output signal of the adder 115. The subtractor 118 subtracts the second offset value, output by the second offset output section 119b, from the output signal of the adder 116.

A main push-pull signal generation section 11 comprises the subtractor 112, adder 113, and AGC section 114. A sub-push-pull signal generation section 12 comprises the adder 115, adder 116, subtractor 117, subtractor 118, subtractor 120, adder 121, AGC section 122, and amplifier 123. A signal correction section 13 comprises the subtractor 117, subtractor 118, first offset output section 119a, and second offset output section 119b.

Further, a tracking control device 10 includes at least the subtractor 112, adder 113, adder 115, adder 116, subtractor 117, subtractor 118, first offset output section 119a, second offset output section 119b, subtractor 120, adder 121, and microcomputer 301. The tracking control device 10 is formed using a single-chip integrated circuit.

The microcomputer 301 calculates the other-layer stray light signal component based on the modulation degree of a signal obtained by photoelectric conversion of sub-beam return light, the modulation degree of a signal obtained by photoelectric conversion of main beam return light, and the AC component of a signal obtained by photoelectric conversion of sub-beam return light.

In Embodiment 3, the main push-pull signal generation section 11 is equivalent to one example of a main push-pull signal generation section, the sub-push-pull signal generation section 12 is equivalent to one example of a sub-push-pull signal generation section, the microcomputer 301 is equivalent to one example of an other-layer stray light detection section, and the signal correction section 13 is equivalent to one example of a signal correction section.

Operation of the optical disc device configured as described above is explained. Explanations of operation which is similar to that in Embodiments 1 and 2 are omitted.

The output signal SA of the preamplifier 111 is input to the microcomputer 301. The output signal of the adder 115 is input to the microcomputer 301. The microcomputer 301 calculates the other-layer stray light signal component included in the output signal from the adder 115 based on the difference between the modulation degree of the input output signal SA of the preamplifier 111 and the modulation degree of the output signal of the adder 115, and sets the calculated other-layer stray light signal component in the first offset output section 119a.

Further, the output signal SB of the preamplifier 111 is input to the microcomputer 301. The output signal of the adder 116 is input to the microcomputer 301. The microcomputer 301 calculates the other-layer stray light signal component included in the output signal of the adder 116 based on the difference between the modulation degree of the input output signal SB of the preamplifier 111 and the modulation degree of the output signal of the adder 116, and sets the calculated other-layer stray light signal component in the second offset output section 119b.

Here, detection and correction for the other-layer stray light signal component in Embodiment 3 are explained using FIG. 5.

Figure 5A:
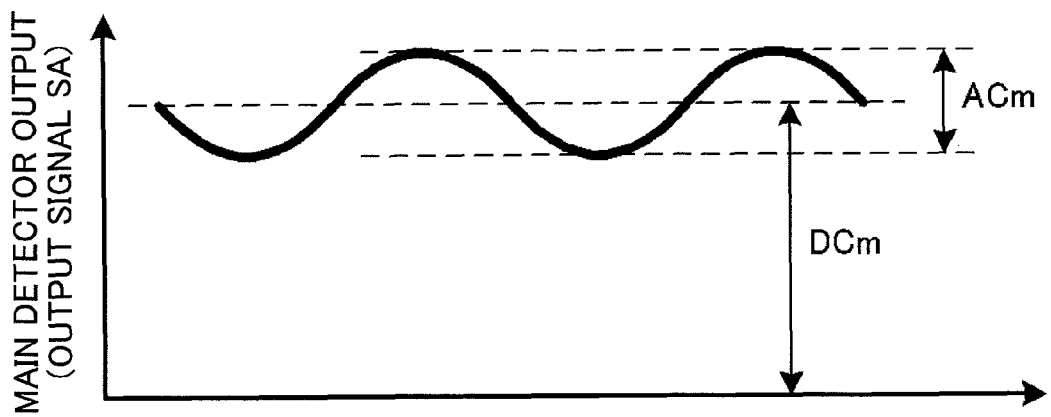
FIG. 5A and FIG. 5B are waveform diagrams showing main detector output signals and sub-detector output signals in Embodiment 3 of the invention.
Figure 5B:
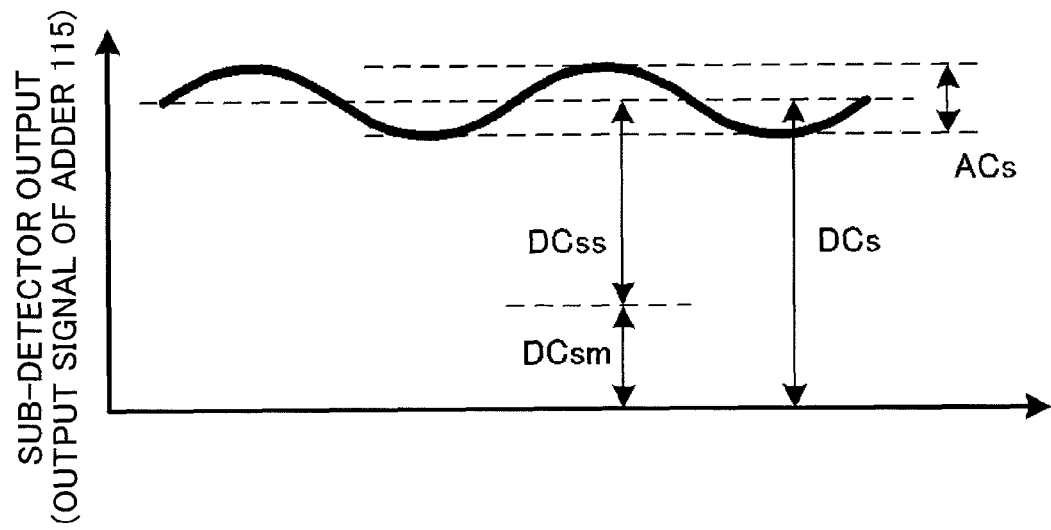

FIG. 5A and FIG. 5B are waveform diagrams showing main detector output signals and sub-detector output signals in Embodiment 3 of the invention.

FIG. 5A is a waveform diagram showing the output signal SA of the preamplifier 111 corresponding to detection region A of the main detector 109a. In FIG. 5A, the DC component of the signal is DCm, and the AC component is ACm. The modulation degree, which is the ratio of the DC component DCm to the AC component ACm, is Mm. On the other hand, FIG. 5B is a waveform diagram showing the output signal of the adder 115. In FIG. 5B, the signal DC component is DCs, and the AC component is ACs. The modulation degree, which is the ratio of the DC component DCs to the AC component ACs, is Ms.

The DC component DCs of the output signal of the adder 115, which is the output of the first sub-detector 109b and second sub-detector 109c, includes a DC component DCss corresponding to the sub-beam return light, and a DC component DCsm corresponding to the other-layer stray light due to the main beam. That is, the DC component DCs of the output signal of the adder 115 is expressed by equation (3) below.

$$DCs=DCss+DCsm \quad (3)$$

Further, the ratio of the AC component ACs of the output signal of the adder 115, which is the output of the first sub-detector 109b and second sub-detector 109c, to the DC component DCss corresponding to the sub-beam return light (the DC component resulting by excluding the DC component of other-layer stray light DCsm from the DC component DCs of the output signal of the adder 115) is equal to the modulation degree Mm. Consequently, the following equation (4) obtains.

$$ACs/DCss=Mm \quad (4)$$

From the above equations (3) and (4), the DC component DCsm is expressed by equation (5) below.

$$DCsm=ACs \times (1/Ms-1/Mm) \quad (5)$$

In Embodiment 3, the microcomputer 301 sets the DC component DCsm of other-layer stray light calculated based on equation (5) above in the first offset output section 119a as the first offset value. The subtractor 117 subtracts the first offset value, output by the first offset output section 119a, from the output signal of the adder 115. By this means, the other-layer stray light signal component included in the output signal of the adder 115 is removed.

Further, the microcomputer 301 calculates the DC component DCsm of other-layer stray light due to the main beam, detected by the first sub-detector 109b and second sub-detector 109c, using equation (5) above from the output signal SB of the preamplifier 111 and the output signal of the adder 116, and sets the calculated DC component DCsm in the second offset output section 119b as the second offset value. The subtractor 118 subtracts the second offset value, output by the second offset output section 119b, from the output value of the adder 116. By this means, the other-layer stray light signal component included in the output signal of the adder 116 is removed.

That is, the microcomputer 301 sets the DC component of other-layer stray light calculated based on the output signal SA of the preamplifier 111 and the output signal of the adder 115 in the first offset output section 119a as the first offset value, and sets the DC component of other-layer stray light calculated based on the output signal SB of the preamplifier 111 and the output signal of the adder 116 in the second offset output section 119b as the second offset value. The subtractor 117 subtracts the first offset value output by the first offset output section 119a from the output value of the adder 115, and the subtractor 118 subtracts the second offset value output by the second offset output section 119b from the output signal of the adder 116. By this means, the other-layer stray light signal components included in the outputs of the first and second sub-detectors 109b and 109c can be removed.

Hence in Embodiment 3, tracking control can be performed using a DPP signal generated from the STE_AGC signal from which other-layer stray light signal components have been removed appropriately according to the multilayer optical disc used in information recording or reproduction. Consequently, even when the information layer reflectivities change, or the light beam irradiation power changes during recording and reproduction, the detection gain is held constant, and stable tracking control is possible. As a result, the recording and reproduction performance of the optical disc device can be improved.

(Embodiment 4)

FIG. 6 is a block diagram showing the configuration of the optical disc device of Embodiment 4 of the invention. The same symbols are assigned to components similar to those in Embodiments 1 through 3, and explanations are omitted.

In FIG. 6, the optical disc device comprises an optical pickup 100, preamplifier 111, subtractor 112, adder 113, AGC section 114, adder 115, adder 116, subtractor 117, subtractor 118, first offset output section 119a, second offset output section 119b, subtractor 120, adder 121, AGC section 122, amplifier 123, subtractor 124, tracking control section 125, tracking driving section 126, microcomputer 301, and memory 601.

The output signal of the adder 115 is input to the subtractor 117, and is also input to the microcomputer 301; the output signal of the adder 116 is input to the subtractor 118, and is also input to the microcomputer 301. The memory 601 is a storage circuit which stores data.

Further, a main push-pull signal generation section 11 comprises the subtractor 112, adder 113 and AGC section 114. A sub-push-pull signal generation section 12 comprises the adder 115, adder 116, subtractor 117, subtractor 118, subtractor 120, adder 121, AGC section 122, and amplifier 123. A signal correction section 13 comprises the subtractor 117, subtractor 118, first offset output section 119a, and second offset output section 119b.

Further, a tracking control device 10 includes at least the subtractor 112, adder 113, adder 115, adder 116, subtractor 117, subtractor 118, first offset output section 119a, second offset output section 119b, subtractor 120, adder 121, microcomputer 301, and memory 601. The tracking control device 10 is formed using a single-chip integrated circuit.

The memory 601 stores in advance the modulation degree of a signal obtained by photoelectric conversion of the sub-beam return light obtained when a main beam and a sub-beam are converted on an optical disc having one information layer. The microcomputer 301 calculates the other-layer stray light signal component based on the modulation degree of the signal obtained by photoelectric conversion of sub-beam return light, the modulation degree stored in the memory 601, and the AC component of the signal obtained by photoelectric conversion of the sub-beam return light.

In Embodiment 4, the main push-pull signal generation section 11 is equivalent to one example of a main push-pull signal generation section, the sub-push-pull signal generation section 12 is equivalent to one example of a sub-push-pull signal generation section, the memory 601 is equivalent to one example of a modulation degree storing section, the microcomputer 301 is equivalent to one example of an other-layer stray light detection section, and the signal correction section 13 is equivalent to one example of a signal correction section.

Operation of the optical disc device configured as described above is explained. Explanations of operation which is similar to that in Embodiments 1 through 3 are omitted.

When the optical disc device performs operation to record or reproduce information using a single-layer optical disc having one information layer, the microcomputer 301 stores the modulation degree of a signal input by the adder 115 and the modulation degree of a signal input by the adder 116 in the memory 601. The microcomputer 301 calculates the other-layer stray light signal component included in the output signal of the adder 115 based on the difference between the modulation degree of the output signal of the adder 115 stored in the memory 601 and the modulation degree of the output signal input from the adder 115, and sets the calculated other-layer stray light signal component in the first offset output section 119a.

Further, the microcomputer 301 calculates the other-layer stray light signal component included in the output signal of the adder 116 based on the difference between the modulation degree of the output signal of the adder 116 stores in the memory 601 and the modulation degree of the output signal input to the adder 116, and sets the calculated other-layer stray light signal component in the second offset output section 119b.

Here, detection and correction for the other-layer stray light signal component in Embodiment 4 are explained using FIG. 7.

FIG. 7A and FIG. 7B are waveform diagrams showing a sub-detector output signal corresponding to a single-layer optical disc and a sub-detector output signal corresponding to a two-layer optical disc, in Embodiment 4 of the invention.

FIG. 7A is a waveform diagram showing the output signal of the adder 115 when a single-layer optical disc is irradiated with a light beam. In FIG. 7A, the signal DC component is DCsl, and the AC component is ACsl. Further, the modulation degree, which is the ratio of the DC component DCsl to the AC component ACsl, is Msl. On the other hand, FIG. 7B is a waveform diagram showing the output signal of the adder 115 when a two-layer optical disc is irradiated with a light beam. In FIG. 7B, the signal DC component is DCdl, and the AC component is ACdl. Further, the modulation degree, which is the ratio of the DC component DCdl to the AC component ACdl, is Mdl.

In the case of irradiation of a two-layer optical disc with a light beam, the DC component DCdl of the output signal of the adder 115, which is the output of the first sub-detector 109b and second sub-detector 109c, includes a DC component DCdls corresponding to sub-beam return light and a DC component DCdlm corresponding to other-layer stray light due to the main beam. That is, the DC component DCdl of the output signal of the adder 115 is expressed by equation (6) below.

$$DCdl = DCdls + DCdlm \quad (6)$$

Further, the ratio of the AC component ACdl of the output signal of the adder 115, which is the output from the first sub-detector 109b and the second sub-detector 109c, to the DC component DCdls corresponding to sub-beam return light (the DC component obtained by excluding the other-layer stray light DC component DCdlm from the DC component DCdl of the output signal of the adder 115), is equal to the modulation degree Msl. Hence the following equation (7) obtains.

$$ACdl/DCdls = Msl \quad (7)$$

From the above equations (6) and (7), the DC component DCdlm is expressed by equation (8) below.

$$DCdlm = ACdl \times (1/Mdl - 1/Msl) \quad (8)$$

In Embodiment 4, by first performing reproduction operation using a single-layer optical disc in advance in a process of manufacturing and adjustment of the optical disc device, the microcomputer 301 stores the modulation degree Msl in memory 601. Then, when performing recording or reproduction of information on a two-layer optical disc, the microcomputer 301 sets the DC component DCdlm of the other-layer stray light signal component calculated based on equation (8) above in the first offset output section 119a as the first offset value. The subtractor 117 subtracts the first offset value output by the first offset output section 119a from the output signal of the adder 115. By this means, the other-layer stray light signal component included in the output signal of the adder 115 is removed.

Further, the microcomputer 301 similarly removes the other-layer stray light signal component from the output signal of the adder 116. That is, the microcomputer 301 stores in advance, in memory 601, the modulation degree Msl of the output signal of the adder 116 for a case in which a single-layer optical disc is irradiated with a light beam. Then, when performing recording or reproduction of information on a two-layer optical disc, the microcomputer 301 sets the DC component DCdlm of the other-layer stray light signal component calculated based on equation (8) above in the second offset output section 119b as the second offset value. The subtractor 118 subtracts the second offset value output by the second offset output section 119b from the output signal of the adder 116. By this means, the other-layer stray light signal component included in the output signal of the adder 116 is removed.

That is, the memory 601 stores the modulation degrees of the output signals of the adders 115 and 116 in cases in which a single-layer optical disc is irradiated with a light beam. The microcomputer 301 sets in the first offset output section 119a, as the first offset value, the DC component of other-layer stray light calculated based on a modulation degree stored in the memory 601 and on the output signal of the adder 115, and sets in the second offset output section 119b, as the second offset value, the DC component of other-layer stray light calculated based on a modulation degree stored in the memory 601 and on the output signal of the adder 116. The subtractor 117 subtracts the first offset value output by the first offset output section 119a from the output signal of the adder 115, and the subtractor 118 subtracts the second offset value output by the second offset output section 119b from the output signal of the adder 116. By this means, the other-layer stray light signal components included in the outputs of the first and second sub-detectors 109b and 109c can be removed.

Hence in Embodiment 4, tracking control can be performed using a DPP signal generated from the STE_AGC signal from which other-layer stray light signal components have been removed appropriately according to the multilayer optical disc used in information recording or reproduction. Consequently, even when the information layer reflectivities change, or the light beam irradiation power changes during recording and reproduction, the detection gain is held constant, and stable tracking control is possible. As a result, the recording and reproduction performance of the optical disc device can be improved.

In Embodiment 4, the modulation degrees of the output signals of the adders 115 and 116 which are stored in the memory 601 are acquired in advance at the time of recording or reproduction using a single-layer optical disc; but the invention is not limited to this configuration in particular, and the following configuration may be used.

That is, each time the optical disc device records or reproduces information onto or from a single-layer optical disc, the microcomputer 301 acquires the modulation degrees of the output signals of the adders 115 and 116. The microcomputer 301 calculates the average values of the acquired modulation degrees of the output signals and of the modulation degrees of the output signals previously stored in the memory 601. The microcomputer 301 updates each of the modulation degrees of the output signals previously stored in the memory 601 with the calculated average values of the output signals.

Each time information recording or reproduction onto or from an optical disc having one information layer is performed, the memory 601 stores the average value of the modulation degree of a signal obtained by photoelectric conversion of sub-beam return light, and the modulation degree previously stored in the memory 601.

By employing the above configuration, each time the optical disc device records information to or reproduces information from a single-layer optical disc, the modulation degree stored in the memory 601 is updated, so that even when the modulation degree of detector output changes due to change with aging of the optical pickup 100, the other-layer stray light signal component can be calculated with good precision. As a result, the recording and reproduction performance of the optical disc device can be improved.

The microcomputer 301 may acquire the modulation degrees of the output signals for the adders 115 and 116 each time the optical disc device performs information recording or reproduction to or from a single-layer optical disc, and update the modulation degrees of the output signals previously stored in the memory 601 to the acquired modulation degrees of the output signals.

Each of the function blocks of the preamplifier 111, subtractor 112, adder 113, AGC section 114, adder 115, adder 116, subtractor 117, subtractor 118, offset output section 119, subtractor 120, adder 121, AGC section 122, amplifier 123, subtractor 124, tracking control section 125, and tracking driving section 126, and similar, is typically realized as an LSI integrated circuit. These may be made separate single chips, or a section or all of these may be combined in a single chip.

Here, an LSI is assumed, but because of differences in integration levels, the device may be called an IC, a system LSI, a super LSI, or an ultra LSI.

Further, the method of circuit integration is not limited to LSIs, and dedicated circuits or general-use processors may also be employed. A FPGA (Field Programmable Gate Array), which can be programmed after the LSI manufacture, or a reconfigurable processor, the connections and settings within circuit cell in an LSI of which can be reconfigured, may also be employed.

Also, if circuit integration technology to replace LSIs appears, through advances in semiconductor technology or as a separate technology derived therefrom, then of course this technology may be used to perform integration of function blocks. The application of biotechnology or other technologies is also possible.

The above-described specific embodiments principally include an invention having the following configuration.

The tracking control device according to one aspect of the invention is a tracking control device which performs control so as to cause a convergence point of a main beam to scan a track on a prescribed information layer, based on a differential push-pull signal obtained by subtracting a sub-push-pull signal generated from return light of a sub-beam reflected from the prescribed information layer of an information recording medium having a plurality of information layers, from a main push-pull signal generated from return light of the main beam reflected from the prescribed information layer, and the tracking control device comprises a main push-pull signal generation section, which generates a main push-pull signal based on a signal obtained by photoelectric conversion of the return light of the main beam; an other-layer stray light detection section, which detects an other-layer stray light signal component that is included in a signal obtained by photoelectric conversion of the return light of the sub-beam, and that is equivalent to other-layer stray light reflected from information layers different from the information layer on which the main beam is converged; a signal correction section, which corrects the signal obtained by photoelectric conversion of the return light of the sub-beam, based on the other-layer stray light signal component detected by the other-layer stray light detection section; and a sub-push-pull signal generation section, which generates the sub-push-pull signal based on the signal obtained by photoelectric conversion of the return light of the sub-beam corrected by the signal correction section.

By means of this configuration, the other-layer stray light signal component that is included in the signal obtained by photoelectric conversion of the return light of the sub-beam and that is equivalent to other-layer stray light reflected from an information layer different from the information layer on which the main beam is converged, is detected. And, based on the detected other-layer stray light signal component, the signal obtained by photoelectric conversion of the return light of the sub-beam is corrected. Based on the signal obtained by photoelectric conversion of the corrected sub-beam return light, a sub-push-pull signal is generated.

Hence tracking control is performed based on a differential push-pull signal which is corrected for the other-layer stray light signal component equivalent to other-layer stray light reflected from an information layer different from the information layer on which the main beam is converged, so that the stability of tracking control can be improved, and recording and reproduction performance can be improved. Further, a dedicated detector to detect other-layer stray light of the main beam is unnecessary, so that the number of components can be reduced, and manufacturing costs can be lowered.

Further, in the above tracking control device, it is preferable that the other-layer stray light detection section calculate, as the other-layer stray light signal component, a prescribed fraction of a signal level of the signal obtained by photoelectric conversion of the main beam return light.

By means of this configuration, a prescribed fraction of the signal level of the signal obtained by photoelectric conversion of main beam return light is calculated as the other-layer stray light signal component, so that the other-layer stray light signal component can easily be calculated.

Further, in the above tracking control device, it is preferable that the other-layer stray light detection section calculate a light quantity ratio of a main beam return light quantity to an other-layer stray light quantity, and multiply the calculated light quantity ratio by the signal obtained by photoelectric conversion of the main beam return light, to calculate the other-layer stray light signal component.

By means of this configuration, the light quantity ratio of the main beam return light quantity to the other-layer stray light quantity is calculated, and the calculated light quantity ratio is multiplied by the signal obtained by photoelectric conversion of the main beam return light to calculate the other-layer stray light signal component.

Hence by calculating the light quantity ratio of the main beam return light quantity to the other-layer stray light quantity, the other-layer stray light signal component can easily be calculated.

Further, in the above tracking control device, it is preferable that the other-layer stray light detection section calculate a light quantity ratio of a main beam return light quantity to an other-layer stray light quantity for each type of information recording medium, and calculate the other-layer stray light signal component by multiplying the calculated light quantity ratio by the signal obtained by photoelectric conversion of the main beam return light.

By means of this configuration, for each type of information recording medium, the light quantity ratio of the main beam return light quantity to the other-layer stray light quantity is calculated, and the calculated light quantity ratio is multiplied by the signal obtained by photoelectric conversion of the main beam return light, to calculate the other-layer stray light signal component.

Hence the light quantity ratio of the main beam return light quantity to the other-layer stray light quantity is calculated for each type of information recording medium, so that for different kinds of information recording media, tracking control stability can be improved, and recording and reproduction performance can be improved.

Further, in the above tracking control device, it is preferable that the other-layer stray light detection section calculate a light quantity ratio of the main beam return light quantity to the other-layer stray light quantity, based on a light quantity ratio of the main beam to the sub-beam, a light-receiving area of the sub-beam light-receiving section which receives the sub-beam, a detection magnification of the sub-beam light-receiving section, a numerical aperture of the convergence section which causes the main beam and the sub-beam to converge on a prescribed information layer, a refractive index of the cover layer of the information recording medium, and interlayer intervals between the prescribed information layer and other information layers.

By means of this configuration, the light quantity ratio of the main beam return light quantity to the other-layer stray light quantity is calculated based on the light quantity ratio of the main beam to the sub-beam, the light-receiving area of the sub-beam light-receiving section which receives the sub-beam, the detection magnification of the sub-beam light-receiving section, the numerical aperture of the convergence section which causes convergence of the main beam and the sub-beam on a prescribed information layer, the refractive index of the cover layer of the information recording medium, and the interlayer intervals between the prescribed information layer and other information layers.

Hence the light quantity ratio of the main beam return light quantity to the other-layer stray light quantity can be calculated based on the light quantity ratio of the main beam to the sub-beam, the light-receiving area of the sub-beam light-receiving section which receives the sub-beam, the detection magnification of the sub-beam light-receiving section, the numerical aperture of the convergence section which causes convergence of the main beam and the sub-beam on a prescribed information layer, the refractive index of the cover layer of the information recording medium, and the interlayer intervals between the prescribed information layer and other information layers, and the light quantity ratio can be used to calculate the other-layer stray light signal component.

Further, in the above tracking control device, it is preferable that the other-layer stray light detection section calculate the other-layer stray light signal component based on a modulation degree of the signal obtained by photoelectric conversion of the sub-beam return light, a modulation degree of the signal obtained by photoelectric conversion of the main beam return light, and an AC component of the signal obtained by photoelectric conversion of the sub-beam return light.

By means of this configuration, the other-layer stray light signal component is calculated based on the modulation degree of the signal obtained by photoelectric conversion of the sub-beam return light, the modulation degree of the signal obtained by photoelectric conversion of the main beam return light, and the AC component of the signal obtained by photoelectric conversion of the sub-beam return light.

Hence the other-layer stray light signal component is calculated from the signal obtained by photoelectric conversion of the sub-beam return light and from the signal obtained by photoelectric conversion of the main beam return light, so that the accurate other-layer stray light signal component can be calculated taking into consideration variation between individual optical pickups and tracking control devices, and the detection precision of the other-layer stray light signal component can be improved.

Further, in the above tracking control device, it is preferable that a modulation degree storing section be further comprised which stores in advance a modulation degree of the signal obtained by photoelectric conversion of the sub-beam return light, obtained when the main beam and the sub-beam are caused to converge on an information recording medium having one information layer, and that the other-layer stray light detection section calculate the other-layer stray light signal component based on a modulation degree of the signal obtained by photoelectric conversion of the sub-beam return light, the modulation degree stored in the modulation degree storing section, and an AC component of the signal obtained by photoelectric conversion of the sub-beam return light.

By means of this configuration, the modulation degree of a signal obtained by photoelectric conversion of the sub-beam return light obtained when the main beam and sub-beam are caused to converge on an information recording medium having one information layer is stored in advance in a modulation degree storing section. And, the other-layer stray light signal component is calculated based on the modulation degree of the signal obtained by photoelectric conversion of the sub-beam stray light, the modulation degree stored in the modulation degree storing section, and the AC component of the signal obtained by photoelectric conversion of the sub-beam return light.

Hence by storing in advance the modulation degree of a signal obtained by photoelectric conversion of the sub-beam return light obtained when the main beam and sub-beam are caused to converge on an information recording medium having one information layer, the accurate other-layer stray light signal component can be calculated taking into consideration variation between individual optical pickups and tracking control devices, and the detection precision of the other-layer stray light signal component can be improved.

Further, in the above tracking control device, it is preferable that, each time information is recorded or reproduced to or from an information recording medium having one information layer, the modulation degree storing section store an average value of the modulation degree of the signal obtained by photoelectric conversion of the sub-beam return light and the modulation degree previously stored in the modulation degree storing section.

By means of this configuration, each time information is recorded or reproduced to or from an information recording medium having one information layer, the average value of the modulation degree of the signal obtained by photoelectric conversion of the sub-beam return light and the modulation degree previously stored in the modulation degree storing section is stored in the modulation degree storing section.

Hence even when the modulation degree of the signal obtained by photoelectric conversion of the sub-beam return light changes due to change with aging of the optical pickup, the other-layer stray light signal component can be calculated with good precision.

The tracking control method according to another aspect of the invention is a tracking control method for performing control so as to cause a convergence point of a main beam to scan a track on a prescribed information layer, based on a differential push-pull signal obtained by subtracting a sub-push-pull signal generated from return light of a sub-beam reflected from the prescribed information layer of an information recording medium having a plurality of information layers, from a main push-pull signal generated from return light of the main beam reflected from the prescribed information layer, the tracking control method comprising the steps of: generating a main push-pull signal based on a signal obtained by photoelectric conversion of the return light of the main beam; detecting an other-layer stray light signal component that is included in a signal obtained by photoelectric conversion of the return light of the sub-beam, and that is equivalent to other-layer stray light reflected from an information layer different from the information layer on which the main beam is converged; correcting the signal obtained by photoelectric conversion of the return light of the sub-beam based on the other-layer stray light signal component detected in the step of detecting an other-layer stray light signal component; and generating the sub-push-pull signal based on the signal obtained by photoelectric conversion of the return light of the sub-beam, corrected in the step of correcting the signal.

By means of this configuration, the other-layer stray light signal component that is included in the signal obtained by photoelectric conversion of the return light of the sub-beam and that is equivalent to other-layer stray light reflected from an information layer different from the information layer on which the main beam is converged, is detected. And, based on the detected other-layer stray light signal component, the signal obtained by photoelectric conversion of the return light of the sub-beam is corrected. Based on the signal obtained by photoelectric conversion of the corrected sub-beam return light, a sub-push-pull signal is generated.

Hence tracking control can be performed based on a differential push-pull signal corrected for the other-layer stray light signal component equivalent to the other-layer stray light reflected from an information layer different from the information layer on which the main beam is converged, so that the stability of tracking control can be improved, and recording and reproduction performance can be improved. Further, a dedicated detector to detect other-layer stray light of the main beam is unnecessary, so that the number of components can be reduced, and manufacturing costs can be lowered.

The optical disc device according to another aspect of the invention comprises an optical pickup, including a convergence section which causes a main beam and a sub-beam to converge on a prescribed information layer of an information recording medium having a plurality of information layers, a main beam light-receiving section which receives return light of the main beam reflected by the prescribed information layer, a sub-beam light-receiving section which receives return light of the sub-beam reflected by the prescribed information layer, and a track direction movement section which moves the convergence section in a direction perpendicular to a track on the information layer; any one of the tracking control devices described above; a differential push-pull signal generation section, which generates a differential push-pull signal obtained by subtracting a sub-push-pull signal generated by the tracking control device, from a main push-pull signal generated by the tracking control device; and a tracking control section, which drives the track direction movement section based on the differential push-pull signal generated by the differential push-pull signal generation section, and performs control so as to cause a convergence point of the main beam to scan the track on the information layer.

By means of this configuration, the other-layer stray light signal component that is included in the signal obtained by photoelectric conversion of the return light of the sub-beam and that is equivalent to other-layer stray light reflected from an information layer different from the information layer on which the main beam is converged, is detected. And, based on the detected other-layer stray light signal component, the signal obtained by photoelectric conversion of the return light of the sub-beam is corrected. Based on the signal obtained by photoelectric conversion of the corrected sub-beam return light, a sub-push-pull signal is generated. Next, a differential push-pull signal is generated by subtracting the sub-push-pull signal generated by the tracking control device from the main push-pull signal generated by the tracking control device. Then, based on the generated differential push-pull signal, the track direction movement section is driven, and control is performed so as to cause the convergence point of the main beam to scan a track on the information layer.

Hence tracking control can be performed based on a differential push-pull signal corrected for the other-layer stray light signal component, equivalent to the other-layer stray light reflected from an information layer different from the information layer on which the main beam is converged, so that the stability of tracking control can be improved, and recording and reproduction performance can be improved. Further, a dedicated detector to detect other-layer stray light of the main beam is unnecessary, so that the number of components can be reduced, and manufacturing costs can be lowered.

A tracking control device, tracking control method, and optical disc device of this invention can improve stability of tracking control, and can improve recording and reproduction performance, and are particularly useful as a tracking control device, tracking control method, and optical disc device which perform tracking control for a multilayer optical disc having a plurality of stacked information layers.

Further, a tracking control device, tracking control method, and optical disc device of this invention are useful for DVD recorders equipped with red-light lasers, Blu-ray disc recorders equipped with blue-light lasers, and similar. Further, application not only to recorders, but also to players, the drive devices of personal computers, and other devices is also possible.

This application is based on Japanese Patent Application No. 2009-104988, filed on Apr. 23, 2009, the contents of which are hereby incorporated by reference.

The specific embodiments or practical examples presented in the detailed description of the invention are merely illustrations of the technical content of the invention, and the invention should not be understood as limited to these specific examples, but can be implemented with various modifications within the spirit of the invention and the Scope of Claims described below.

What is claimed is:

1. A tracking control device which performs control so as to cause a convergence point of a main beam to scan a track on a prescribed information layer of an information recording medium having a plurality of information layers, based on a differential push-pull signal obtained by subtracting (i) a sub-push-pull signal generated from return light of a sub-beam reflected from the prescribed information layer from (ii) a main push-pull signal generated from return light of the main beam reflected from the prescribed information layer, the tracking control device comprising:
   a main push-pull signal generation section which generates the main push-pull signal based on a signal obtained by photoelectric conversion of the return light of the main beam;
   an other-layer stray light calculation section which (i) obtains the signal obtained by photoelectric conversion of the return light of the main beam, (ii) calculates a light quantity ratio of a light quantity of the return light of the main beam to a light quantity of other-layer stray light, and (iii) multiplies the calculated light quantity ratio by the signal obtained by the photoelectric conversion of the return light of the main beam to calculate an other-layer stray light signal component that is (i) included in a signal obtained by photoelectric conversion of the return light of the sub-beam and (ii) equivalent to other-layer stray light reflected from an information layer different from the information layer on which the main beam is converged;
   a signal correction section which corrects the signal obtained by photoelectric conversion of the return light of the sub-beam, based on the other-layer stray light signal component calculated by the other-layer stray light calculation section; and
   a sub-push-pull signal generation section which generates the sub-push-pull signal based on the signal obtained by photoelectric conversion of the return light of the sub-beam, corrected by the signal correction section.

2. The tracking control device according to claim 1, wherein the other-layer stray light calculation section calculates, for each type of the information recording medium, the light quantity ratio of the light quantity of the return light of the main beam to the light quantity of the other-layer stray light, and calculates the other-layer stray light signal component by multiplying the calculated light quantity ratio by the signal obtained by photoelectric conversion of the return light of the main beam.

3. The tracking control device according to claim 1, wherein the other-layer stray light calculation section calculates the light quantity ratio of the light quantity of the return light of the main beam to the light quantity of the other-layer stray light based on a light quantity ratio of the main beam to the sub-beam, a light-receiving area of a sub-beam light-receiving section which receives the sub-beam, a detection magnification of the sub-beam light-receiving section, a numerical aperture of a convergence section which causes the main beam and the sub-beam to converge on a prescribed information layer, a refractive index of a cover layer of the information recording medium, and interlayer intervals between the prescribed information layer and other information layers.

4. A tracking control device which performs control so as to cause a convergence point of a main beam to scan a track on a prescribed information layer of an information recording medium having a plurality of information layers, based on a differential push-pull signal obtained by subtracting (i) a sub-push-pull signal generated from return light of a sub-beam reflected from the prescribed information layer from (ii) a main push-pull signal generated from return light of the main beam reflected from the prescribed information layer, the tracking control device comprising:
   a main push-pull signal generation section which generates the main push-pull signal based on a signal obtained by photoelectric conversion of the return light of the main beam;
   an other-layer stray light calculation section which calculates an other-layer stray light signal component that is (i) included in a signal obtained by photoelectric conversion of the return light of the sub-beam and (ii) equivalent to other-layer stray light reflected from an information layer different from the information layer on which the main beam is converged, based on a modulation degree of the signal obtained by photoelectric conversion of the return light of the sub-beam, a modulation degree of the signal obtained by photoelectric conversion of the return light of the main beam, and an AC component of the signal obtained by photoelectric conversion of the return light of the sub-beam;
   a signal correction section which corrects the signal obtained by photoelectric conversion of the return light of the sub-beam, based on the other-layer stray light signal component calculated by the other-layer stray light calculation section; and
   a sub-push-pull signal generation section which generates the sub-push-pull signal based on the signal obtained by photoelectric conversion of the return light of the sub-beam, corrected by the signal correction section.

5. A tracking control device which performs control so as to cause a convergence point of a main beam to scan a track on a prescribed information layer of an information recording medium having a plurality of information layers, based on a differential push-pull signal obtained by subtracting (i) a sub-push-pull signal generated from return light of a sub-beam reflected from the prescribed information layer from (ii) a main push-pull signal generated from return light of the main beam reflected from the prescribed information layer, the tracking control device comprising:
   a main push-pull signal generation section which generates the main push-pull signal based on a signal obtained by photoelectric conversion of the return light of the main beam;
   a modulation degree storing section which stores, in advance, a modulation degree of a signal obtained by photoelectric conversion of the return light of the sub-beam obtained when the main beam and the sub-beam are caused to converge on an information recording medium having one information layer;
   an other-layer stray light calculation detection section which calculates an other-layer stray light signal component that is (i) included in a signal obtained by photoelectric conversion of the return light of the sub-beam and (ii) equivalent to other-layer stray light reflected from an information layer different from the information layer on which the main beam is converged, based on a modulation degree of the signal obtained by photoelectric conversion of the return light of the sub-beam, the modulation degree stored in the modulation degree storing section, and an AC component of the signal obtained by photoelectric conversion of the return light of the sub-beam;
a signal correction section which corrects the signal obtained by photoelectric conversion of the return light of the sub-beam, based on the other-layer stray light signal component calculated by the other-layer stray light calculation section; and
a sub-push-pull signal generation section which generates the sub-push-pull signal based on the signal obtained by photoelectric conversion of the return light of the sub-beam, corrected by the signal correction section.

6. The tracking control device according to claim 5, wherein, each time information is recorded or reproduced to or from an information recording medium having one information layer, the modulation degree storing section stores an average value of the modulation degree of the signal obtained by photoelectric conversion of the return light of the sub-beam and the modulation degree previously stored in the modulation degree storing section.

7. A tracking control method for performing control so as to cause a convergence point of a main beam to scan a track on a prescribed information layer of an information recording medium having a plurality of information layers, based on a differential push-pull signal obtained by subtracting (i) a sub-push-pull signal generated from return light of a sub-beam reflected from the prescribed information layer from (ii) a main push-pull signal generated from return light of the main beam reflected from the prescribed information layer, the tracking control method comprising steps of:
generating the main push-pull signal based on a signal obtained by photoelectric conversion of the return light of the main beam;
calculating an other-layer stray light signal component that is (i) included in a signal obtained by photoelectric conversion of the return light of the sub-beam and (ii) equivalent to other-layer stray light reflected from an information layer different from the information layer on which the main beam is converged, the other-layer stray light signal being calculating by obtaining the signal obtained by photoelectric conversion of the return light of the main beam, calculating a light quantity ratio of a light quantity of the return light of the main beam to a light quantity of the other-layer stray light, and multiplying the calculated light quantity ratio by the signal obtained by photoelectric conversion of the return light of the main beam;
correcting the signal obtained by photoelectric conversion of the return light of the sub-beam based on the other-layer stray light signal component calculated in the step of calculating the other-layer stray light signal component; and
generating the sub-push-pull signal based on the signal obtained by photoelectric conversion of the return light of the sub-beam, corrected in the step of correcting the signal.

8. An optical disc device, comprising:
an optical pickup including (i) a convergence section which causes a main beam and a sub-beam to converge on a prescribed information layer of an information recording medium having a plurality of information layers, (ii) a main beam light-receiving section which receives return light of the main beam reflected by the prescribed information layer, (iii) a sub-beam light-receiving section which receives return light of the sub-beam reflected by the prescribed information layer, and (iv) a track direction movement section which moves the convergence section in a direction perpendicular to a track on the prescribed information layer; and
a tracking control device which performs control so as to cause a convergence point of the main beam to scan the track on the prescribed information layer of the information recording medium having the plurality of information layers, based on a differential push-pull signal obtained by subtracting (i) a sub-push-pull signal generated from the return light of the sub-beam reflected from the prescribed information layer from (ii) a main push-pull signal generated from the return light of the main beam reflected from the prescribed information layer,
wherein the tracking control device includes:
a main push-pull signal generation section which generates the main push-pull signal based on a signal obtained by photoelectric conversion of the return light of the main beam;
an other-layer stray light calculation section which (i) obtains the signal obtained by photoelectric conversion of the return light of the main beam, (ii) calculates a light quantity ratio of a light quantity of the return light of the main beam to a light quantity of other-layer stray light, and (iii) multiplies the calculated light quantity ratio by the signal obtained by the photoelectric conversion of the return light of the main beam to calculate an other-layer stray light signal component that is (i) included in a signal obtained by photoelectric conversion of the return light of the sub-beam and (ii) equivalent to other-layer stray light reflected from an information layer different from the information layer on which the main beam is converged;
a signal correction section which corrects the signal obtained by photoelectric conversion of the return light of the sub-beam, based on the other-layer stray light signal component calculated by the other-layer stray light calculation section; and
a sub-push-pull signal generation section which generates the sub-push-pull signal based on the signal obtained by photoelectric conversion of the return light of the sub-beam, corrected by the signal correction section, and
wherein the optical disc device further comprises:
a differential push-pull signal generation section which generates the differential push-pull signal obtained by subtracting (i) the sub-push-pull signal generated by the tracking control device from (ii) the main push-pull signal generated by the tracking control device; and
a tracking control section which (i) drives the track direction movement section based on the differential push-pull signal generated by the differential push-pull signal generation section, and (ii) performs control so as to cause the convergence point of the main beam to scan the track on the prescribed information layer.

9. A tracking control method for performing control so as to cause a convergence point of a main beam to scan a track on a prescribed information layer of an information recording medium having a plurality of information layers, based on a differential push-pull signal obtained by subtracting (i) a sub-push-pull signal generated from return light of a sub-beam reflected from the prescribed information layer from (ii) a main push-pull signal generated from return light of the main beam reflected from the prescribed information layer, the tracking control method comprising steps of:
- generating the main push-pull signal based on a signal obtained by photoelectric conversion of the return light of the main beam;
- calculating an other-layer stray light signal component that is (i) included in a signal obtained by photoelectric conversion of the return light of the sub-beam and (ii) equivalent to other-layer stray light reflected from an information layer different from the information layer on which the main beam is converged, based on a modulation degree of the signal obtained by photoelectric conversion of the return light of the sub-beam, a modulation degree of the signal obtained by photoelectric conversion of the return light of the main beam, and an AC component of the signal obtained by photoelectric conversion of the return light of the sub-beam;
- correcting the signal obtained by photoelectric conversion of the return light of the sub-beam, based on the other-layer stray light signal component detected in the step of calculating an other-layer stray light signal component; and
- generating the sub-push-pull signal based on the signal obtained by photoelectric conversion of the return light of the sub-beam, corrected in the step of correcting the signal.

10. An optical disc device, comprising:
- an optical pickup including (i) a convergence section which causes a main beam and a sub-beam to converge on a prescribed information layer of an information recording medium having a plurality of information layers, (ii) a main beam light-receiving section which receives return light of the main beam reflected by the prescribed information layer, (iii) a sub-beam light-receiving section which receives return light of the sub-beam reflected by the prescribed information layer, and (iv) a track direction movement section which moves the convergence section in a direction perpendicular to a track on the prescribed information layer; and
- a tracking control device which performs control so as to cause a convergence point of the main beam to scan the track on the prescribed information layer of the information recording medium having the plurality of information layers, based on a differential push-pull signal obtained by subtracting (i) a sub-push-pull signal generated from the return light of the sub-beam reflected from the prescribed information layer from (ii) a main push-pull signal generated from the return light of the main beam reflected from the prescribed information layer,
- wherein the tracking control device includes:
  - a main push-pull signal generation section which generates the main push-pull signal based on a signal obtained by photoelectric conversion of the return light of the main beam;
  - an other-layer stray light calculation section which calculates an other-layer stray light signal component that is (i) included in a signal obtained by photoelectric conversion of the return light of the sub-beam and (ii) equivalent to other-layer stray light reflected from an information layer different from the information layer on which the main beam is converged, based on a modulation degree of the signal obtained by photoelectric conversion of the return light of the sub-beam, a modulation degree of the signal obtained by photoelectric conversion of the return light of the main beam, and an AC component of the signal obtained by photoelectric conversion of the return light of the sub-beam;
  - a signal correction section which corrects the signal obtained by photoelectric conversion of the return light of the sub-beam, based on the other-layer stray light signal component calculated by the other-layer stray light calculation section; and
  - a sub-push-pull signal generation section which generates the sub-push-pull signal based on the signal obtained by photoelectric conversion of the return light of the sub-beam, corrected by the signal correction section, and
- wherein the optical disc device further comprises:
  - a differential push-pull signal generation section which generates the differential push-pull signal obtained by subtracting (i) the sub-push-pull signal generated by the tracking control device from (ii) the main push-pull signal generated by the tracking control device; and
  - a tracking control section which (i) drives the track direction movement section based on the differential push-pull signal generated by the differential push-pull signal generation section, and (ii) performs control so as to cause the convergence point of the main beam to scan the track on the prescribed information layer.

11. A tracking control method for performing control so as to cause a convergence point of a main beam to scan a track on a prescribed information layer of an information recording medium having a plurality of information layers, based on a differential push-pull signal obtained by subtracting (i) a sub-push-pull signal generated from return light of a sub-beam reflected from the prescribed information layer from (ii) a main push-pull signal generated from return light of the main beam reflected from the prescribed information layer, the tracking control method comprising steps of:
- generating the main push-pull signal based on a signal obtained by photoelectric conversion of the return light of the main beam;
- storing, in advance, a modulation degree of a signal obtained by photoelectric conversion of the return light of the sub-beam obtained when the main beam and the sub-beam are caused to converge on an information recording medium having one information layer;
- calculating an other-layer stray light signal component that is (i) included in a signal obtained by photoelectric conversion of the return light of the sub-beam and (ii) equivalent to other-layer stray light reflected from an information layer different from the information layer on which the main beam is converged, based on a modulation degree of the signal obtained by photoelectric conversion of the return light of the sub-beam, the modulation degree stored in the step of storing, and an AC component of the signal obtained by photoelectric conversion of the return light of the sub-beam;
- correcting the signal obtained by photoelectric conversion of the return light of the sub-beam, based on the other-layer stray light signal component detected in the step of calculating an other-layer stray light signal component; and
- generating the sub-push-pull signal based on the signal obtained by photoelectric conversion of the return light of the sub-beam, corrected in the step of correcting the signal.

12. An optical disc device, comprising:

an optical pickup including (i) a convergence section which causes a main beam and a sub-beam to converge on a prescribed information layer of an information recording medium having a plurality of information layers, (ii) a main beam light-receiving section which receives return light of the main beam reflected by the prescribed information layer, (iii) a sub-beam light-receiving section which receives return light of the sub-beam reflected by the prescribed information layer, and (iv) a track direction movement section which moves the convergence section in a direction perpendicular to a track on the prescribed information layer; and a tracking control device which performs control so as to cause a convergence point of the main beam to scan the track on the prescribed information layer of the information recording medium having the plurality of information layers, based on a differential push-pull signal obtained by subtracting (i) a sub-push-pull signal generated from the return light of the sub-beam reflected from the prescribed information layer from (ii) a main push-pull signal generated from the return light of the main beam reflected from the prescribed information layer, wherein the tracking control device includes:

a main push-pull signal generation section which generates the main push-pull signal based on a signal obtained by photoelectric conversion of the return light of the main beam;

a modulation degree storing section which stores, in advance, a modulation degree of a signal obtained by photoelectric conversion of the return light of the sub-beam obtained when the main beam and the sub-beam are caused to converge on an information recording medium having one information layer;

an other-layer stray light calculation detection section which calculates an other-layer stray light signal component that is (i) included in a signal obtained by photoelectric conversion of the return light of the sub-beam and (ii) equivalent to other-layer stray light reflected from an information layer different from the information layer on which the main beam is converged, based on a modulation degree of the signal obtained by photoelectric conversion of the return light of the sub-beam, the modulation degree stored in the modulation degree storing section, and an AC component of the signal obtained by photoelectric conversion of the return light of the sub-beam;

a signal correction section which corrects the signal obtained by photoelectric conversion of the return light of the sub-beam, based on the other-layer stray light signal component calculated by the other-layer stray light calculation section; and a sub-push-pull signal generation section which generates the sub-push-pull signal based on the signal obtained by photoelectric conversion of the return light of the sub-beam, corrected by the signal correction section, and wherein the optical disc device further comprises:

a differential push-pull signal generation section which generates the differential push-pull signal obtained by subtracting (i) the sub-push-pull signal generated by the tracking control device from (ii) the main push-pull signal generated by the tracking control device; and a tracking control section which (i) drives the track direction movement section based on the differential push-pull signal generated by the differential push-pull signal generation section, and (ii) performs control so as to cause the convergence point of the main beam to scan the track on the prescribed information layer.

* * * * *